US011780285B2

(12) United States Patent
Jefferies et al.

(10) Patent No.: US 11,780,285 B2
(45) Date of Patent: Oct. 10, 2023

(54) ADAPTIVE SUSPENSION SYSTEM

(71) Applicant: REE Automotive Ltd., Kibbutz Glil-Yam (IL)

(72) Inventors: Ivan Jefferies, Swadlincote (GB); Damian Andrew Harty, Loggerheads (GB)

(73) Assignee: REE AUTOMOTIVE LTD, Kibbutz Glil Yam (IL)

( * ) Notice: Subject to any disclaimer, the term of this patent is extended or adjusted under 35 U.S.C. 154(b) by 0 days.

(21) Appl. No.: 17/980,594

(22) Filed: Nov. 4, 2022

(65) Prior Publication Data

US 2023/0256789 A1    Aug. 17, 2023

Related U.S. Application Data

(60) Provisional application No. 63/309,900, filed on Feb. 14, 2022.

(51) Int. Cl.
*B60G 17/052* (2006.01)
*B60G 17/015* (2006.01)

(52) U.S. Cl.
CPC ....... *B60G 17/0523* (2013.01); *B60G 17/015* (2013.01)

(58) Field of Classification Search
CPC ............ B60G 17/0523; B60G 17/0525; B60G 17/015; B60G 17/017; B60G 2800/202
See application file for complete search history.

(56) References Cited

U.S. PATENT DOCUMENTS

| 3,666,286 A * | 5/1972 | Engfer ................. | B60G 17/015 280/5.514 |
| 4,278,272 A * | 7/1981 | Leibeling .............. | B60P 1/6409 280/124.159 |
| 4,785,920 A | 11/1988 | Knecht et al. | |
| 7,240,906 B2 | 7/2007 | Klees | |
| 8,220,604 B2 | 7/2012 | Jee et al. | |

(Continued)

FOREIGN PATENT DOCUMENTS

| DE | 102017212532 A1 | 1/2019 |
| JP | 5952760 B2 | 7/2016 |

OTHER PUBLICATIONS

Machine translation of JP 5952760 (Japanese patent published on Jul. 13, 2016).

(Continued)

*Primary Examiner* — Frank B Vanaman
(74) *Attorney, Agent, or Firm* — Momentum IP; Marc Van Dyke

(57) ABSTRACT

A suspension system for a wheel assembly of a vehicle includes a telescopic damper configured to mediate between respective sprung and unsprung portions of the wheel assembly, a rebound spring arranged to moderate wheel travel, and a force-transfer system operative to apply a force to change one or more parameters of the suspension system. The application of the force by the force-transfer system is effective in a first operating mode to change a length of the telescopic damper and in a second operating mode to regulate a wheel rate of the wheel assembly. The force-transfer system is controllable to modify a wheel-travel value at which the wheel rate of the wheel assembly changes in the second mode of suspension operation.

22 Claims, 20 Drawing Sheets

(56) References Cited

U.S. PATENT DOCUMENTS

| | | | |
|---|---|---|---|
| 8,262,100 B2 | 9/2012 | Thomas | |
| 8,413,997 B1 * | 4/2013 | Coombs | B60G 17/017 |
| | | | 280/6.151 |
| 9,452,656 B2 | 9/2016 | Kubota et al. | |
| 10,328,764 B2 * | 6/2019 | Murakami | B62K 25/283 |
| 11,466,747 B2 | 10/2022 | Nakano et al. | |
| 2003/0015830 A1 * | 1/2003 | Miller | B60G 15/08 |
| | | | 267/140.11 |
| 2008/0179795 A1 * | 7/2008 | Fox | B60G 15/12 |
| | | | 267/64.11 |
| 2015/0314664 A1 * | 11/2015 | Mochizuki | F16F 9/56 |
| | | | 280/6.157 |
| 2016/0348749 A1 * | 12/2016 | Carcaterra | F16F 15/022 |
| 2019/0118604 A1 | 4/2019 | Suplin et al. | |

OTHER PUBLICATIONS

U.S. Appl. No. 17/980,594, inventors Jefferies, Ivan et al., filed Nov. 4, 2022.
Machine Translation (Google Patents) for DE 102017212532 published on Jan. 24, 2019.
International Search Report for PCT/IB2023/051332 dated Jun. 8, 2023.
Written Opinion for PCT/IB2023/051332 dated Jun. 8, 2023.

* cited by examiner

Rebound

Design

Bump

PRIOR ART

Full rebound

Fixed knee point *1001 of Fig. 4*

Design

Bump

Step S01 (at a first time) kneel the vehicle 10 at a respective wheel assembly 150 by applying a force to shorten the telescopic damper 101

Step S02 (at a second time) modify a wheel-travel value at which the wheel rate of the respective wheel assembly 150 changes, by controlling application of a force to change one or more parameters of a suspension system 100

Design

Knelt

Design with changed gap

Design

Zero gap

Knelt

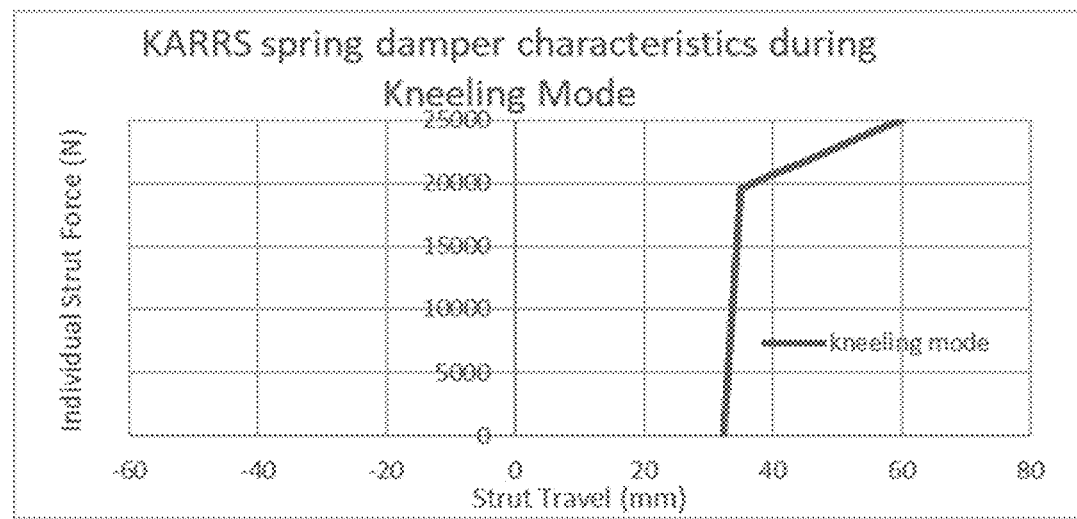
FIG. 18
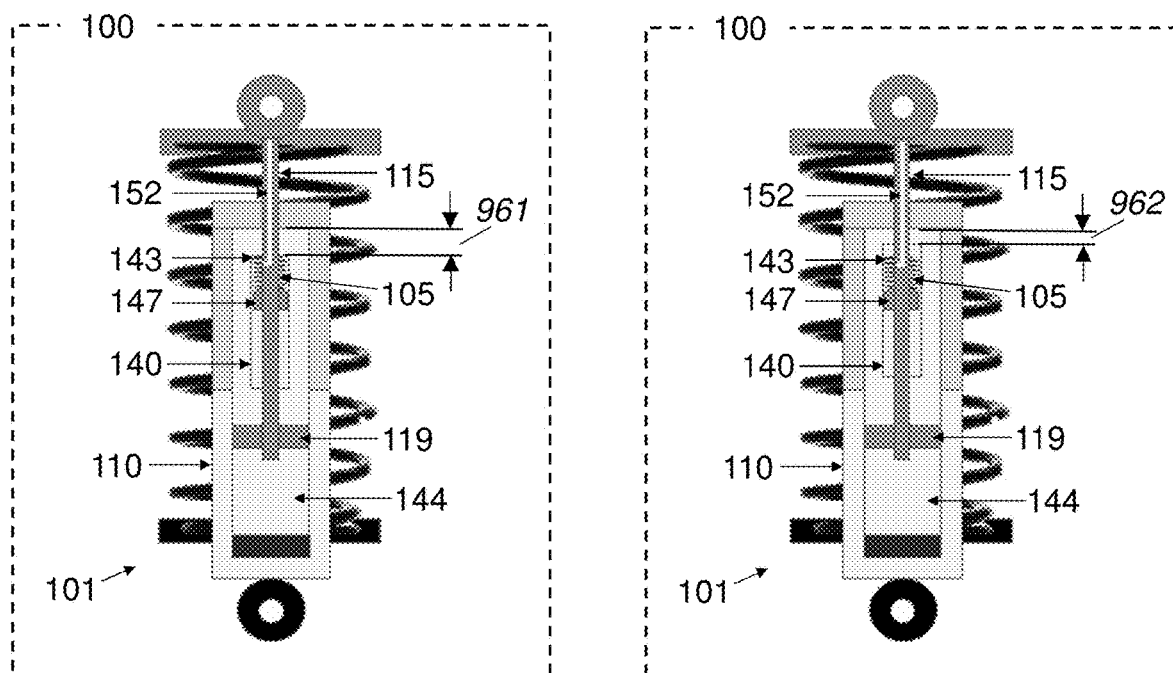
Design
FIG. 19A
with changed gap
FIG. 19B

Design

Knelt

Step S11 kneel the vehicle at a respective wheel assembly 150 by regulating a pressure in the active chamber 143 so as to change a position of the internal rebound cylinder 140 relative to the rebound striker 112 and kneel the vehicle 10 at the wheel assembly 150

Step S21 modify a wheel-travel value at which the wheel rate of a respective wheel assembly 150 changes, by controlling a hydraulic system 170 to regulate the hydraulic pressure in the active chamber 143 of the internal rebound cylinder 140

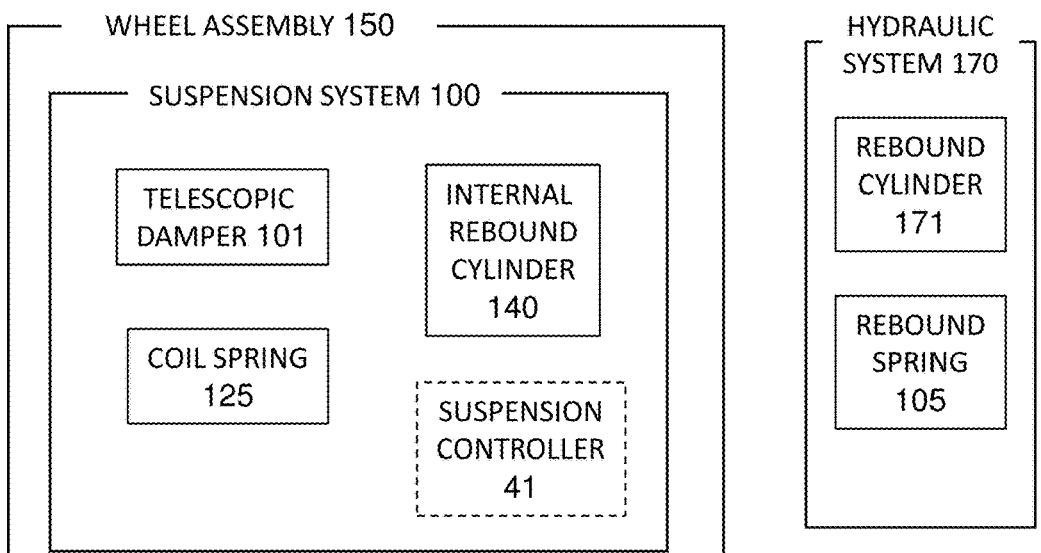
FIG. 31
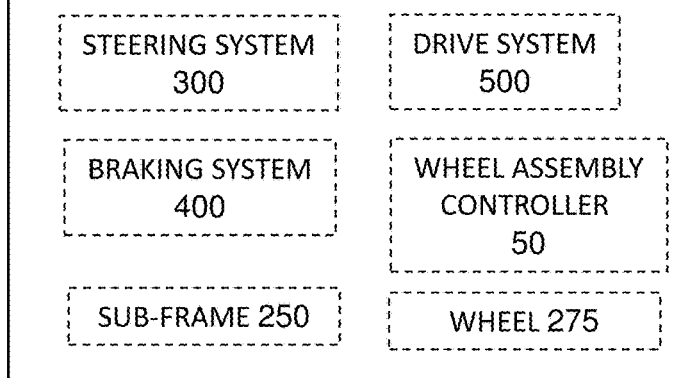
FIG. 32B
FIG. 32A

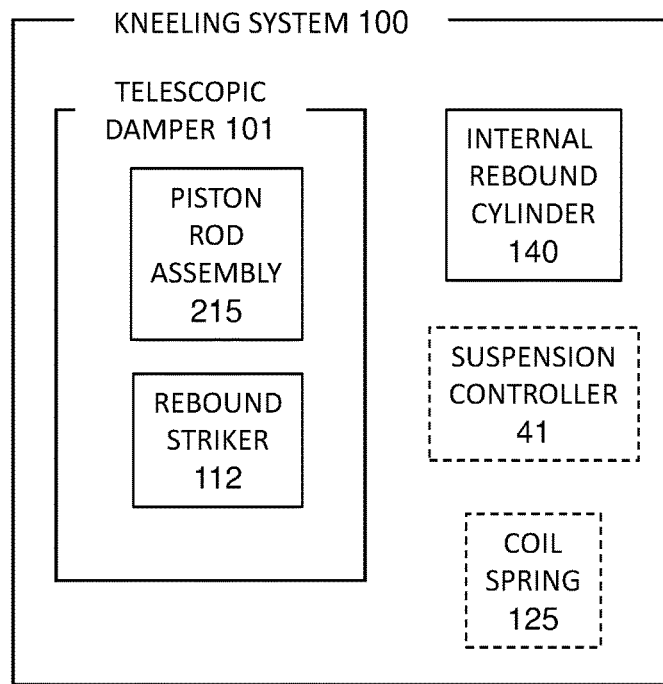
FIG. 34
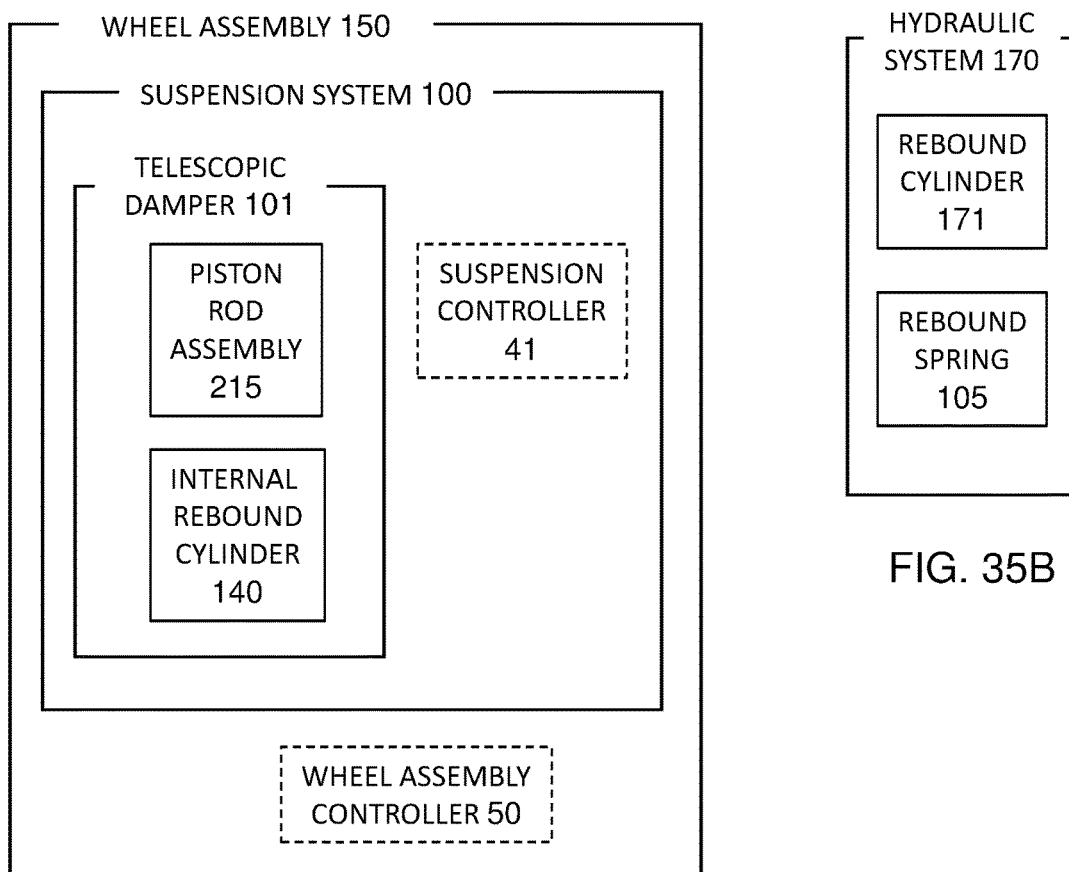
FIG. 35B
FIG. 35A

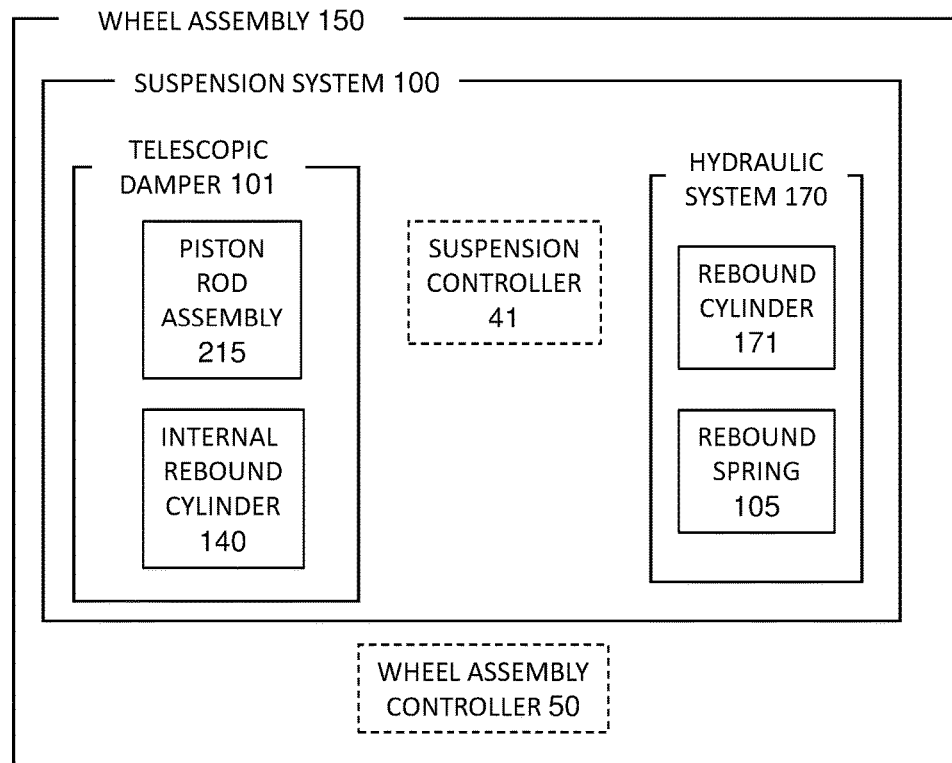
FIG. 35C
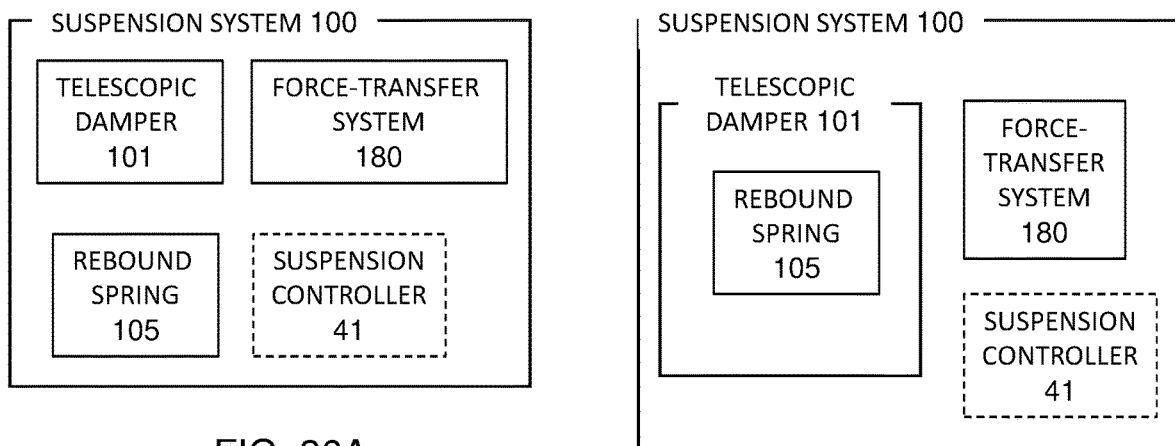
FIG. 36A
FIG. 36B

Step S31 (at a first time) kneel the vehicle 10 at a respective wheel assembly 150 by applying a force to shorten the telescopic damper 101

Step S32 (at a second time) modify a wheel-travel value at which the wheel rate of a respective wheel assembly 150 changes, by controlling application of the force to change one or more parameters of the suspension system 100

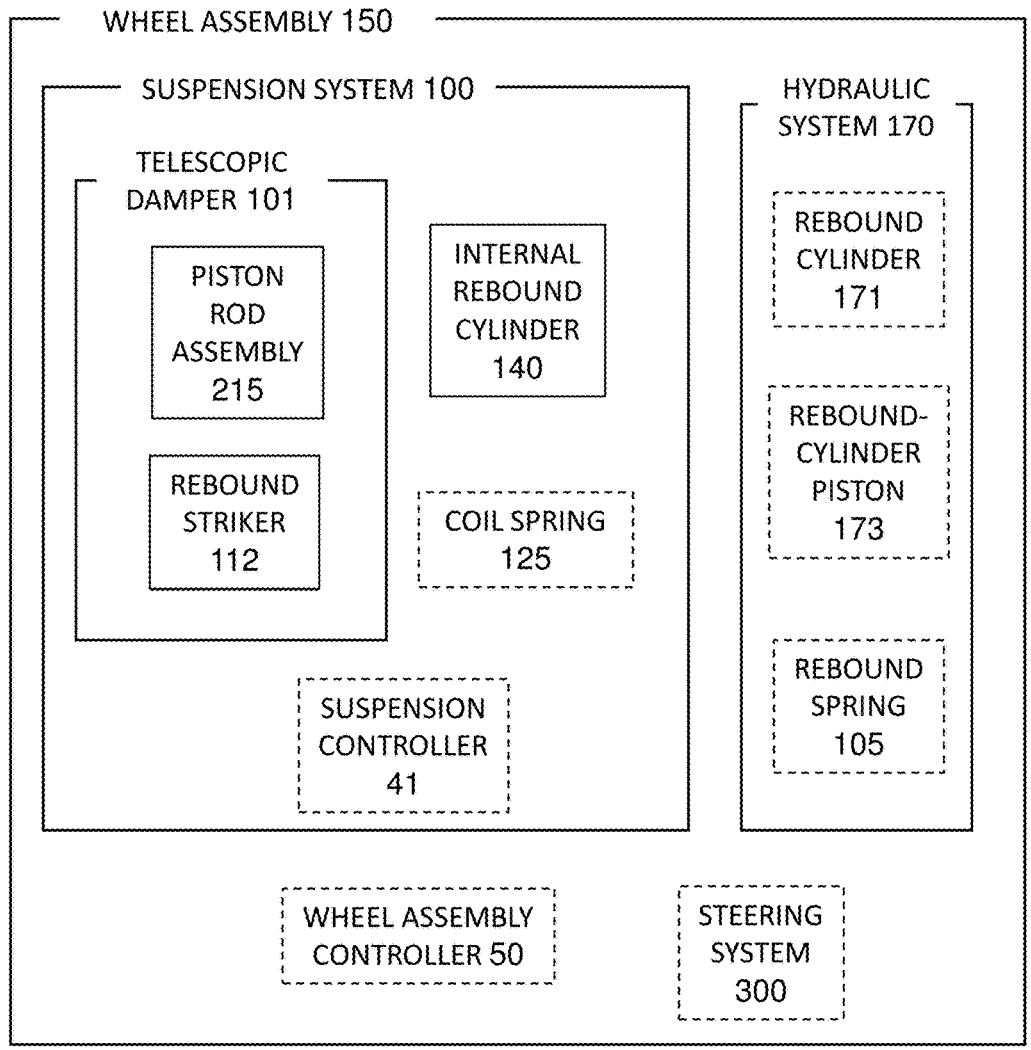

FIG. 38

Step S41 (at a first time) kneel the vehicle 10 at a respective wheel assembly 150 by increasing a hydraulic pressure in the active chamber 143 of an internal rebound cylinder 140 to apply a force that shortens the telescopic damper 101

Step S42 (at a second time) modify a wheel-travel value at which the wheel rate of a respective wheel assembly 150 changes, by controlling a hydraulic system 170 to regulate hydraulic pressure in the active chamber 143 of an internal rebound cylinder 140

FIG. 39

ADAPTIVE SUSPENSION SYSTEM

CROSS-REFERENCE TO RELATED APPLICATIONS

This patent application claims the benefit of U.S. Provisional Patent Application No. 63/309,900 filed on Feb. 14, 2022, which is incorporated herein by reference in its entirety.

FIELD OF THE INVENTION

The present invention relates to suspension systems and particularly to adaptive suspension systems having controlled length and/or motion ratio.

BACKGROUND

Vehicle kneeling systems are increasingly common features of vehicles used in public transportation and for private use. The idea of a kneeling system is that the vehicle height is lowered, e.g., to curb height, at some or all of its wheels so as to provide a level or at least lower-angle path for entry to and exit from the vehicle. The technologies of existing kneeling systems range from linear actuators and limit switches in smaller vehicles to large pneumatic systems for large transit buses. However, many existing kneeling systems have problems with regards to reliability and durability, at least because the kneeling system bears a load during normal, i.e., driving operation of the vehicle and not just during the kneeling process. In such prior art kneeling systems, a failure of the kneeling system, e.g., of a pneumatic system, leaves the vehicle in the knelt position and unable to drive.

Adaptive suspension systems have been developed and improved over the course of more than a century, resulting in sophisticated designs that, inter alia, allow designers to set a wheel travel rate at which suspensions become stiffer or softer so as to allow a softer, more comfortable ride at design ride height (or higher) but engage additional stiffness features, often acting on or within the shock absorber, to provide a stiffer wheel rate below a fixed damper extension length. Some prior art systems do not allow for dynamic adjustment of when suspension stiffness changes, as the ride and handling characteristics of the vehicle are often factory-set.

SUMMARY

The embodiments disclosed herein relate to suspension systems, wheel assemblies, vehicle platforms, and vehicles and methods for their operation.

Some embodiments relate to suspension systems that can provide a kneeling function at a wheel assembly, or at multiple wheel assemblies in combination. In some such embodiments, the kneeling system is not 'energized' until needed, that is, its components do not substantially bear a load (e.g., of the vehicle weight) during non-kneeling driving operation, and bear load only in certain circumstances including when the vehicle is knelt at a respective wheel assembly. A non-limiting illustrative feature in some such kneeling systems is that in case of a failure of the kneeling system, such as, for example, an electrical or mechanical failure, the vehicle is not left in a knelt state but rather in a non-knelt state which enables driving of the vehicle in a non-kneeling operating mode.

Some embodiments relate to suspension systems that enable control of wheel rate such that the wheel-travel value at which a wheel rate changes (referred to as a 'knee point' of a wheel rate curve) can be dynamically changed during travel of a vehicle (or at other times) in accordance with driving conditions/or and desired ride characteristics. According to embodiments, the wheel rate is controllable for each one of the wheel assemblies that include such a suspension system. Some embodiments relate to suspension systems that provide both a vehicle kneeling function and a dynamic wheel-rate curve control function, for example when operating in different operating modes of the suspensions systems and/or of the vehicles. Some embodiments relate to regulating a maximum steering angle of the steering system through control of the suspension systems disclosed herein.

According to some embodiments of the present disclosure, the architecture of a suspension system offering a kneeling system acts in parallel to a typical vehicle's suspension system. In such embodiments, the system bears no load outside of its operating modes, and therefore provides a failure mode that maintains typical driving functionality. Such a system can offer reduced energy consumption compared to existing technologies due to the system only being active to add a force supplementary to the normal wheel load to kneel the vehicle in a 'kneeling' operating mode. In a 'wheel-rate regulating' operating mode, displacement changes to alter the rebound spring knee point also require very little force; in many scenarios only an internal gap is adjusted and the rebound spring continues to contribute passively.

According to embodiments disclosed herein, a suspension system for a wheel assembly of a vehicle comprises: (a) a telescopic damper configured to mediate between respective sprung and unsprung portions of the wheel assembly; (b) a rebound spring arranged to moderate wheel travel; and (c) a force-transfer system operative to apply a force to change one or more parameters of the suspension system, wherein (i) the application of the force by the force-transfer system is effective in a first operating mode of suspension operation to change a length of the telescopic damper and in a second operating mode of suspension operation to regulate a wheel rate of the wheel assembly, and (ii) the force-transfer system is controllable to modify a wheel-travel value at which the wheel rate of the wheel assembly changes in the second mode of suspension operation.

In some embodiments, the force-transfer system can be controllable to modify a wheel-travel value at which the wheel rate of the wheel assembly decreases in the second mode of vehicle operation.

In some embodiments, the changing of the length of the telescopic damper can be effective to kneel the vehicle at the wheel assembly.

In some embodiments, the one or more parameters of the suspension system can include a wheel-travel value at which the rebound spring is engaged in the second operating mode.

In some embodiments, the suspension system can further comprise an internal rebound cylinder disposed within the telescopic damper, the internal rebound cylinder encompassing a rebound stop of the telescopic damper. In some embodiments, the force-transfer system can include a hydraulic system in fluid communication with the internal rebound cylinder. In some embodiments, the rebound spring can be disposed within the internal rebound cylinder.

In some embodiments, the hydraulic system can include an external rebound cylinder, and the rebound spring can be arranged within the hydraulic system to be compressible by pressure in the external rebound cylinder. In some embodiments, the internal rebound cylinder can comprise an active chamber in fluid communication with the hydraulic system. In some embodiments, the telescopic damper can comprise a piston rod housing a fluid channel having an aperture in fluid communication with the active chamber of the internal rebound cylinder. In some embodiments, the hydraulic system can comprise a reservoir in fluid communication with both the external rebound cylinder and the active chamber of the internal rebound cylinder.

In some embodiments, the internal rebound cylinder can include a dead chamber having a resilient biasing member disposed therewithin.

In some embodiments, the suspension system can additionally comprise a ride spring characterized by a rest length and a fully-compressed length, and the changing of the length of the telescopic damper that is effective to kneel the vehicle can be effective to compress the ride spring to the fully-compressed length.

In some embodiments, the suspension system can comprise at least two telescopic dampers configured to jointly mediate between respective sprung and unsprung portions of the wheel assembly. In some such embodiments, the force-transfer system can comprise exactly one hydraulic system that includes the external rebound cylinder, the rebound spring can be arranged within the exactly one hydraulic system to be compressible by pressure in the external rebound cylinder, and the exactly one hydraulic system can be in fluid communication, in parallel, with the respective internal rebound cylinders of the at least two dampers.

In some embodiments, the rebound spring can be disposed within the telescopic damper. In some such embodiments, the force-transfer system can include a mechanical actuator for changing a distance between the rebound spring and a rebound striker of the telescopic damper.

In some embodiments, a wheel assembly can comprise a suspension system according to any of the foregoing embodiments, of any preceding claim, and an electronics array for controlling operation of the force-transfer system. In some embodiments, the wheel assembly can additionally comprise a steering system, and the external force-transfer actuator can be controllable, in a third mode of vehicle operation, to modify a rebound limit of the telescopic damper to regulate a maximum steering angle of the steering system. In some embodiments, it can be that in the absence of a force applied by the force-transfer system, the suspension system is effective to operate in the second mode of vehicle operation at a design ride height.

In some embodiments, a vehicle platform can comprise a plurality of wheel assemblies according to any one of the foregoing embodiments of wheel assemblies, and the respective force-transfer system of each wheel assembly of the plurality of wheel assemblies can be individually controllable to change a respective wheel-travel value at which a wheel rate of the wheel assembly changes in the second mode of vehicle operation. In some embodiments, a method of operating a vehicle comprising such a vehicle platform can comprise, for each wheel assembly of the plurality of wheel assemblies: (a) at a first time, kneeling the vehicle at the respective wheel assembly by applying the force to shorten the telescopic damper; and (b) at a second time, modifying a wheel-travel value at which the wheel rate of the respective wheel assembly changes, by controlling the application of the force to change the one or more parameters of the suspension system. In some embodiments, it can be that a velocity of the vehicle is substantially zero at the first time, and nonzero at the second time.

According to embodiments disclosed herein, a suspension system for a wheel assembly of a vehicle comprises: (a) a telescopic damper configured to mediate between an unsprung portion and a sprung portion of the wheel assembly, the telescopic damper comprising a rebound striker and a piston rod assembly including a rebound stop; (b) an internal rebound cylinder disposed within the telescopic damper, the internal rebound cylinder encompassing the rebound stop; and (c) a hydraulic system arranged in fluid communication with an active chamber of the internal rebound cylinder, the hydraulic system being controllable to regulate a pressure in the active chamber so as to change a position of the internal rebound cylinder relative to the rebound striker and kneel the vehicle at the wheel assembly.

In some embodiments, the active chamber of the internal rebound cylinder can be in fluid communication with the hydraulic system through a fluid channel disposed in the piston rod of the telescopic damper.

In some embodiments, the kneeling of the vehicle at the wheel assembly can include controlling the hydraulic system to increase a hydraulic pressure in the active chamber of the internal rebound cylinder.

In some embodiments, the internal rebound cylinder can include a dead chamber having a resilient biasing member disposed therewithin.

In some embodiments, the suspension system can additionally comprise a ride spring surrounding a portion of the telescopic damper and characterized by a rest length and a fully-compressed length, and kneeling the vehicle can include compressing the ride spring to the fully-compressed length.

In some embodiments, a wheel assembly can comprise: the suspension system described in any of the foregoing embodiments, and an electronics array for controlling the operation of the hydraulic system. In some embodiments, it can be that when the hydraulic system is not energized, the suspension system is effective to operate, at a design ride height, in a mode that does not include kneeling of the vehicle. In some embodiments, a vehicle platform can comprise a plurality of wheel assemblies according to any of the foregoing embodiments, and the respective hydraulic system of each wheel assembly of the plurality of wheel assemblies can be individually controllable to kneel the vehicle at the respective wheel assembly. In some such embodiments, it can be that the respective hydraulic systems of the plurality of wheel assemblies are jointly controllable, by the respective electronics arrays of the plurality of wheel assemblies being in communication with each other and/or with a controller of the vehicle platform, to kneel the vehicle at the plurality of wheel assemblies. In some embodiments, a method of operating a vehicle comprising the vehicle platform according to any of the foregoing embodiments can comprise, for each wheel assembly of the plurality of wheel assemblies: kneeling the vehicle at the respective wheel assembly by regulating a pressure in the active chamber so as to change a position of the internal rebound cylinder relative to the rebound striker and kneel the vehicle at the wheel assembly. In some such embodiments, changing the hydraulic pressure in the active chamber can include increasing the hydraulic pressure in the active chamber.

According to embodiments disclosed herein, a suspension system for a wheel assembly of a vehicle comprises: (a) a telescopic damper configured to mediate between an unsprung portion and a sprung portion of the wheel assembly, the telescopic damper comprising a rebound striker and a piston rod assembly including a rebound stop; and (b) an internal rebound cylinder disposed within the telescopic damper, the internal rebound cylinder encompassing the rebound stop, an active chamber of the internal rebound cylinder being arranged in fluid communication with a hydraulic system controllable to regulate a pressure in the active chamber so as to change a position of the internal rebound cylinder relative to the rebound striker, and the suspension system can be effective, in a first operating mode, to regulate a wheel rate of the wheel assembly.

In some embodiments, the hydraulic system can include an external rebound cylinder, a rebound-cylinder piston, and a rebound spring arranged to be compressible by the rebound-cylinder piston. In some embodiments, the rebound spring can be compressible by the rebound-cylinder piston to increase a wheel rate of the wheel assembly in the first mode of vehicle operation.

In some embodiments, the hydraulic system can be controllable to change a wheel-travel value at which the wheel rate of the wheel assembly changes in the first mode of vehicle operation. In some such embodiments, the changed wheel-travel value at which the wheel rate of the wheel assembly changes can be negative.

In some embodiments, the active chamber of the internal rebound cylinder can be in fluid communication with the hydraulic system through a fluid channel disposed in the piston rod of the telescopic damper. In some embodiments, the internal rebound cylinder can include a dead chamber having a resilient biasing member disposed therewithin.

In some embodiments, the suspension system can be effective, in a second operating mode, to kneel the vehicle at the wheel assembly. In some embodiments, the kneeling of the vehicle at the wheel assembly in the second mode of vehicle operation can include controlling the hydraulic system to change a hydraulic pressure in the active chamber of the internal rebound cylinder.

In some embodiments, changing the hydraulic pressure in the active chamber includes increasing the hydraulic pressure in the active chamber.

In some embodiments, the suspension system can additionally comprise a ride spring surrounding a portion of the telescopic damper and characterized by a rest length and a fully-compressed length, and kneeling the vehicle in the second mode of vehicle operation can include compressing the ride spring to the fully-compressed length.

In some embodiments, a wheel assembly can comprise: (i) the suspension system of any one of the foregoing embodiments, (ii) the hydraulic system, and (iii) an electronics array for controlling the operation of the suspension system. In some embodiments, it can be that when the hydraulic system is not energized, the suspension system is effective to operate in the first mode of vehicle operation at a design ride height. In some embodiments, the wheel assembly can additionally comprise a steering system, and the hydraulic system can be controllable, in a third mode of vehicle operation, to modify a rebound limit of the telescopic damper to regulate a maximum steering angle of the steering system.

In some embodiments, a vehicle platform can comprise a plurality of wheel assemblies according to any one of the foregoing embodiments, and the respective hydraulic system of each wheel assembly of the plurality of wheel assemblies can be individually controllable to change a respective wheel-travel value at which a wheel rate of the wheel assembly changes in the second mode of vehicle operation. In some embodiments, the respective hydraulic systems of the plurality of wheel assemblies can be jointly controllable, by the respective electronics arrays of the plurality of wheel assemblies being in communication with each other and/or with a controller of the vehicle platform, to kneel the vehicle at the plurality of wheel assemblies.

In some embodiments, a method of operating a vehicle comprising the vehicle platform of any of the foregoing embodiments can comprise, for each wheel assembly of the plurality of wheel assemblies: modifying a wheel-travel value at which the wheel rate of the respective wheel assembly changes, by controlling the hydraulic system to regulate the hydraulic pressure in the active chamber of the internal rebound cylinder. In some embodiments, the modifying of the wheel-travel value can be at a first time, and the method can additionally comprise: at a second time, kneeling the vehicle at the respective wheel assembly by changing a hydraulic pressure in the active chamber of the internal rebound cylinder to apply a force that shortens the telescopic damper. In some embodiments, changing the hydraulic pressure in the active chamber can include increasing the hydraulic pressure in the active chamber. In some embodiments, it can be that a velocity of the vehicle is substantially zero at the second time, and nonzero at the first time.

According to embodiments disclosed herein, a suspension system for a wheel assembly of a vehicle comprises: (a) a yoked pair of telescopic dampers configured to mediate between an unsprung portion and a sprung portion of the wheel assembly, each one of the telescopic dampers comprising: (i) a piston rod assembly including a rebound stop, and (ii) an internal rebound cylinder disposed within the telescopic damper, the internal rebound cylinder encompassing the rebound stop. The suspension system additionally comprises (b) a hydraulic system including (i) a rebound cylinder and (ii) a rebound spring arranged within the hydraulic system to be compressible by pressure in the rebound cylinder, the hydraulic system being arranged in parallel fluid communication with, and controllable to regulate a pressure in, an active chamber of each respective internal rebound cylinder. The suspension system is effective in a first mode of vehicle operation to kneel the vehicle at the wheel assembly and in a second mode of vehicle operation to regulate a wheel rate of the wheel assembly.

In some embodiments, the hydraulic system can be controllable to change a wheel-travel value at which the wheel rate of the wheel assembly decreases in the second mode of vehicle operation.

In some embodiments, a wheel assembly can comprise: the suspension system according to any of the foregoing embodiments, and a control system programmed to control the hydraulic system in both the first and second modes of vehicle operation. In some embodiments, it can be that all of the components of the suspension system are installed in the wheel assembly.

According to embodiments disclosed herein, a kneeling system for a wheel assembly of a vehicle comprises: (a) a telescopic damper configured to mediate between an unsprung portion and a sprung portion of the wheel assembly, the telescopic damper comprising a rebound striker and a piston rod assembly including a rebound stop; and (b) an internal rebound cylinder disposed within the telescopic damper, the internal rebound cylinder encompassing the rebound stop, an active chamber of the internal rebound cylinder being arranged in fluid communication with a hydraulic system controllable to regulate a pressure in the active chamber so as to change a position of the internal rebound cylinder relative to the rebound striker and kneel the vehicle. When the hydraulic system is not energized, the kneeling system is effective to operate at a design ride height so as to allow vehicle travel without kneeling.

In some embodiments, the kneeling can additionally comprise a ride spring characterized by a rest length and a fully-compressed length, wherein kneeling the vehicle includes compressing the ride spring to the fully-compressed length.

According to embodiments, a suspension system for a wheel assembly of a vehicle comprises: (a) a telescopic damper configured to mediate between an unsprung portion and a sprung portion of the wheel assembly, the telescopic damper comprising a rebound striker and a piston rod assembly including a rebound stop; and (b) an internal rebound cylinder disposed within the telescopic damper, the internal rebound cylinder encompassing the rebound stop, an active chamber of the internal rebound cylinder being arranged in fluid communication with a hydraulic system controllable to regulate a pressure in the active chamber.

In some embodiments, the suspension system can additionally comprise the hydraulic system and an electronic array programmed to regulate the operation of the hydraulic system. In some embodiments, the hydraulic system can include an external rebound cylinder, a rebound-cylinder piston, and a rebound spring arranged to be compressible by the rebound-cylinder piston.

According to embodiments disclosed herein, a suspension system comprises: (a) a telescopic damper; (b) a rebound spring; and (c) a force-transfer system operative to apply a force to change one or more parameters of the suspension system, the one or more parameters comprising a length of the telescopic damper in a first mode and comprising an engagement point of the rebound spring in a second mode. In some embodiments, a wheel assembly of a vehicle can comprise the foregoing suspension system.

In some embodiments, the force-transfer system can be controllable to modify a wheel-travel value at which the wheel rate of the wheel assembly changes in the second mode. In some embodiments, the changing of the length of the telescopic damper can be effective to kneel the vehicle at the wheel assembly.

In some embodiments, the one or more parameters can include a wheel-travel value at which the rebound spring is engaged in the second mode.

In some embodiments, the wheel assembly can further comprise an internal rebound cylinder disposed within the telescopic damper, the internal rebound cylinder encompassing a rebound stop of the telescopic damper.

In some embodiments, the force-transfer system can include a hydraulic system in fluid communication with the internal rebound cylinder. In some embodiments, the hydraulic system can include an external rebound cylinder and a rebound-cylinder piston, the rebound spring being arranged within the hydraulic system to be compressible by the rebound-cylinder piston. In some embodiments, the hydraulic system can comprise a reservoir in fluid communication with both the external rebound cylinder and the active chamber of the internal rebound cylinder.

In some embodiments, the rebound spring can be disposed within the internal rebound cylinder. In some embodiments, the internal rebound cylinder can comprise an active chamber in fluid communication with the hydraulic system. In some embodiments, the telescopic damper can comprise a piston rod housing a fluid channel having an aperture in fluid communication with the active chamber of the internal rebound cylinder. In some embodiments, the internal rebound cylinder can include a dead chamber having a resilient biasing member disposed therewithin.

In some embodiments, the wheel assembly can additionally comprise a ride spring characterized by a rest length and a fully-compressed length, and kneeling the vehicle can include compressing the ride spring to the fully-compressed length.

In some embodiments, the wheel assembly can comprise at least two telescopic dampers configured to jointly mediate between respective sprung and unsprung portions of the wheel assembly. In some such embodiments, it can be that the force-transfer system comprises exactly one hydraulic system including the external rebound cylinder, the rebound spring can be arranged within the exactly one hydraulic system to be compressible by pressure in the external rebound cylinder, and the exactly one hydraulic system can be in fluid communication, in parallel, with the respective internal rebound cylinders of the at least two dampers.

In some embodiments, the rebound spring can be disposed within the telescopic damper. In some such embodiments, the force-transfer system can include a mechanical actuator for changing a distance between the rebound spring and a rebound striker of the telescopic damper. In some embodiments, the wheel assembly can additionally comprise a steering system, and the external force-transfer actuator can be controllable, in a third mode of vehicle operation, to modify a rebound limit of the telescopic damper to regulate a maximum steering angle of the steering system.

In some embodiments, in the absence of a force applied by the force-transfer system, the suspension system can be effective to operate in the second mode of vehicle operation at a design ride height.

In some embodiments, a vehicle platform can comprise a plurality of wheel assemblies according to any one of the foregoing embodiments, and the respective force-transfer system of each wheel assembly of the plurality of wheel assemblies can be individually controllable to change a respective wheel-travel value at which a wheel rate of the wheel assembly changes in the second mode of vehicle operation. In some such embodiments, a method of operating a vehicle comprising the vehicle platform can comprise, for each wheel assembly of the plurality of wheel assemblies: (a) at a first time, kneeling the vehicle at the respective wheel assembly by applying the force to shorten the telescopic damper; and (b) at a second time, modifying a wheel-travel value at which the wheel rate of the respective wheel assembly changes, by controlling the application of the force to change the one or more parameters of the suspension system.

According to embodiments disclosed herein, a suspension system for a wheel assembly of a vehicle comprises: (a) a telescopic damper configured to mediate between an unsprung portion and a sprung portion of the wheel assembly, the telescopic damper comprising a rebound striker and a piston rod assembly including a rebound stop; and (b) an internal rebound cylinder disposed within the telescopic damper, the internal rebound cylinder encompassing the rebound stop, an active chamber of the internal rebound cylinder being arranged in fluid communication with a hydraulic system controllable to regulate a pressure in the active chamber so as to change a position of the internal rebound cylinder relative to the rebound striker, wherein the suspension system is effective in a first mode of vehicle operation to kneel the vehicle at the wheel assembly and in a second mode of vehicle operation to regulate a wheel rate of the wheel assembly.

In some embodiments, the hydraulic system can include an external rebound cylinder, a rebound-cylinder piston, and a rebound spring arranged within the hydraulic system to be compressible by the rebound-cylinder piston. In some embodiments, the rebound spring can be compressible by the rebound-cylinder piston to increase a wheel rate of the wheel assembly in the second mode of vehicle operation.

In some embodiments, the hydraulic system can be controllable to change a wheel-travel value at which the wheel rate of the wheel assembly changes in the second mode of vehicle operation. In some such embodiments, the changed wheel-travel value at which the wheel rate of the wheel assembly changes can be negative.

In some embodiments, the active chamber of the internal rebound cylinder can be in fluid communication with the hydraulic system through a fluid channel disposed in the piston rod of the telescopic damper.

In some embodiments, the kneeling of the vehicle at the wheel assembly in the first mode of vehicle operation can include controlling the hydraulic system to increase a hydraulic pressure in the active chamber of the internal rebound cylinder.

In some embodiments, the internal rebound cylinder can include a dead chamber having a resilient biasing member disposed therewithin.

In some embodiments, the suspension system can additionally comprise a ride spring surrounding a portion of the telescopic damper and characterized by a rest length and a fully-compressed length, wherein kneeling the vehicle includes compressing the ride spring to the fully-compressed length.

In some embodiments, a wheel assembly can comprise: (i) the suspension system of any one of the foregoing embodiments, (ii) the hydraulic system, and/or (iii) an electronics array for controlling the operation of the suspension system. In some embodiments, it can be that when the hydraulic system is not energized, the suspension system is effective to operate in the second mode of vehicle operation at a design ride height. In some embodiments, the wheel assembly can additionally comprise a steering system, and the hydraulic system can be controllable, in a third mode of vehicle operation, to modify a rebound limit of the telescopic damper to regulate a maximum steering angle of the steering system.

In some embodiments, a vehicle platform can comprise a plurality of wheel assemblies according to any one of the foregoing embodiments, and the respective hydraulic system of each wheel assembly of the plurality of wheel assemblies can be individually controllable to change a respective wheel-travel value at which a wheel rate of the wheel assembly changes in the second mode of vehicle operation. In some embodiments, a method of operating a vehicle comprising the vehicle platform can comprise, for each wheel assembly of the plurality of wheel assemblies: (a) at a first time, kneeling the vehicle at the respective wheel assembly by increasing a hydraulic pressure in the active chamber of the internal rebound cylinder to apply a force that shortens the telescopic damper; and (b) at a second time, modifying a wheel-travel value at which the wheel rate of the respective wheel assembly changes, by controlling the hydraulic system to regulate the hydraulic pressure in the active chamber of the internal rebound cylinder.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIG. 18 shows a wheel-rate curve for a kneeling vehicle according to embodiments of the present invention.

FIGS. 19A-B are schematic elevation-view drawings of a telescopic damper comprising an internal rebound cylinder, showing a rebound spring disposed within the internal cylinder, in design and changed-gap positions respectively, according to embodiments of the present invention.

FIGS. 27, 29, 32A-B, 33, 34, 35A-C, 36A-D, and 38 are block diagrams of suspension systems, wheel assemblies, hydraulic systems, and kneeling systems, according to embodiments of the present invention.

FIGS. 28, 30, 31, 37 and 39 show flowcharts of methods and method steps for operating vehicles in accordance with embodiments of the present invention.

DETAILED DESCRIPTION OF THE ILLUSTRATED EMBODIMENTS

Figure 1A:
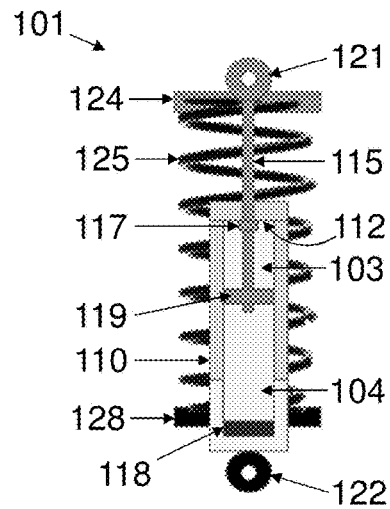
FIGS. 1A-C are schematic elevation-view drawings of a prior-art telescopic damper, at rebound, design and bump heights, respectively.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

In this disclosure, subscripted reference numbers (e.g., $10_1$) may be used to designate multiple separate appearances of elements of a single species, whether in a drawing or not; for example: $10_1$ is a single appearance (out of a plurality of appearances) of element 10. The same elements can alternatively be referred to without subscript (e.g., 10 and not $10_1$) when not referring to a specific one of the multiple separate appearances, or the species in general.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

Embodiments of the present invention can relate to vehicles, vehicle platforms, wheel assemblies for vehicles and suspension systems for vehicles, i.e., for wheel assemblies that are intended to be used on vehicle platforms and in vehicles. Non-limiting examples of a vehicle, according to this definition, are a vehicle with motive power provided by an onboard engine, and an 'electric vehicle' powered, when in motion, by one or more electric motors and a battery (or other energy storage device) onboard. The word 'vehicle' should also be understood as encompassing a "vehicle platform" comprising at least a chassis (or other 'reference frame' to which wheel assemblies can be mounted) and wheels. A 'vehicle platform' need not necessarily comprise, at the time of providing the vehicle platform, any or all of the accoutrements required for transport of passengers and/or cargo such as vehicle-body components or interior furnishings. In some embodiments, a vehicle and a vehicle platform can be the same.

The term 'wheel assemblies' is used to describe assemblies of steering components and/or drivetrain components and/or suspension components. The mounting of a wheel assembly can be done as a unit, but it is not necessarily so, and some components of the wheel assembly may be added onto a wheel assembly that is already 'mounted' to the vehicle platform. A wheel assembly may include a 'sub-frame' to which some or all of the assembly components are mounted or otherwise attached such that the sub-frame mediates between the reference frame and the various assembly components. The term 'sub-frame' can be understood to mean any rigid frame or one or more structural elements in fixed combination. The 'sub' prefix is intended to distinguish the sub-frame from a main frame or reference frame of the vehicle. A wheel assembly or may not include an electric motor and/or the wheel itself.

As the term is generally used, a 'suspension system' is a largely mechanical system for controlling the motion of a vehicle with respect to the ground. As the term is used herein, a suspension system is a sub-system of a wheel assembly for a vehicle, where the wheel assembly can also include, in addition to the suspension system, one or more of a steering system, a braking system, and a drivetrain system, any of which can be present as sub-systems of a wheel assembly. In an illustrative example, a vehicle comprising four wheel assemblies according to the embodiments disclosed herein includes four respective suspension systems according to embodiments, i.e., one in each wheel assembly, each respective suspension system being provided to mediate between a respective sub-frame of the wheel assembly and a respective wheel.

A suspension system includes a telescopic damper. In non-limiting examples throughout this specification and in the attached drawings, the telescopic dampers are illustrated as comprising a damper rod (also called a piston rod) fixed at an upper end to one of the vehicle reference frame, the sub-frame of the wheel assembly, or a suspension arm connected to the reference frame or the wheel assembly. In the same non-limiting examples, the telescopic dampers are also illustrated as comprising a cylinder surrounding a lower portion of the damper rod and fixed at a lower end to a suspension arm connected to the wheel. In other examples, the arrangement of the telescopic damper can be different than in the illustrated examples, while remaining within the scope of the disclosed embodiments. Similarly, any telescopic damper disclosed in the embodiments can be either of a twin-tube design, i.e., having an outer reservoir tube, or of a monotube design, and this design choice does not affect the scope of the disclosed embodiments.

In the various embodiments disclosed herein, a suspension system includes an electronics array that includes at least one electronic device such as a controller or sensor. The term 'controller' as used herein can refer to the electronics array or to any component (or combination of components) of the electronics array. An electronics array can include any combination of hardware, firmware and software, including, without limitation, processors, computer storage and stored program instructions. An electronics array can also include, without limitation, sensors and wired and/or wireless communications devices. An electronics array can be provided to as part of, or together with, the suspension system so as to be at least partly dedicated to the control and operation of the suspension system, or it can be shared amongst various sub-systems of the wheel assembly, e.g., in a wheel-assembly control module, or it can be installed on the vehicle platform, e.g., in a vehicle control module. In some embodiments, a single electronics array installed on the vehicle platform can include one or more controllers that jointly control multiple, or even all, suspension systems mounted to the vehicle. In some embodiments, a suspension controller is configured, in terms of hardware, firmware, and/or software, to coordinate suspension control functions in combination with one or more suspension controllers of other wheel assemblies, and/or with a vehicle controller.

In embodiments, a damper portion of a suspension system can be coupled at a first end to an unsprung portion of the wheel assembly, and at a second end to a sprung portion of the wheel assembly. In some such embodiments, the sprung portion can be mechanically joined to a sub-frame of the wheel assembly or to the reference frame of a vehicle, or configured to be mechanically joined a sub-frame of the wheel assembly or to a reference frame of a vehicle.

In some embodiments, a suspension system can include two or more telescopic dampers to distribute load across the multiple dampers. Any suspension systems shown or described herein as comprising 'a' damper can be understood as including one or more dampers. In some cases, the number 'two' (or the word 'pair') may be applied to the number of dampers in a particular implementation of a suspension system, and in such cases, the suspension system of the particular implementation can be understood as having exactly two dampers.

In some embodiments, wheel assemblies and suspension systems can be provided in opposing pairs, or installed on a vehicle in opposing pairs. Thus, any illustration of a wheel assembly or steering system in the accompanying figures may be appropriate for installation on one side or the other of a vehicle, and a skilled artisan will understand that a 'mirror-image' implementation may be appropriate for the opposing side of the vehicle.

In embodiments, wheel assemblies and steering systems can be employed with wheels which are axle-less and/or independently-suspended. In some vehicles, it can be that a first opposing pair of wheels is axle-less and independently-suspended while a second opposing pair of wheels uses 'conventional' or 'prior-art' arrangements of an axle and suspension system. In other vehicles, it can be that all opposing pairs of wheels are axle-less and independently-suspended. Some vehicles may implement the disclosed embodiments with respect to wheel assemblies and steering systems only at a first pair of wheels as disclosed herein, and some other vehicles may implement the embodiments at all wheels.

Figure 1B:
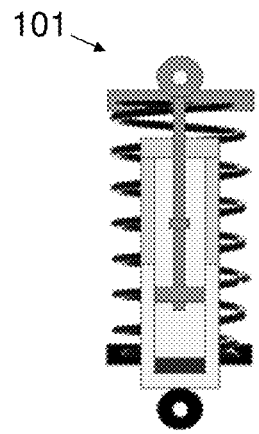
Figure 1C:
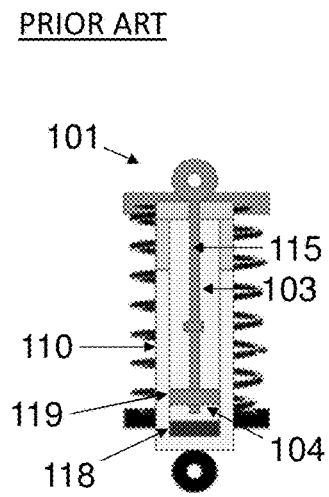

Referring now to the figures, and in particular to FIGS. 1A, 1B and 1C, a prior art telescopic damper 101 is schematically illustrated at various lengths reflecting various respective conditions. The damper 101 is shown in FIG. 1A at maximum rebound extension, in that it can be seen that the rebound stop 117 has reached the rebound striker 112. FIG. 1B shows a 'design' length, i.e., corresponding to a design ride height of a vehicle. In some designs, the ride spring 125 is at rest, i.e., neither compressed nor extended, at this design point. FIG. 1C shows the damper in the bump condition, i.e., at its minimum length, e.g., following a 'bump' in a roadway.

The telescopic dampers 101 disclosed herein can include any or all of the following elements, listed here in order of respective reference numbers shown in FIG. 1A; the reference numbers are maintained for like components throughout the instant specification.

103—upper volume of damper
    104—lower volume of damper
    105—rebound spring
    110—damper tube, or, equivalently, damper body or cylinder.
    112—rebound striker
    115—damper rod, or, equivalently, piston rod
    117—rebound stop
    118—base valve
    119—piston valve
    121—top mount
    122—lower mount
    124—upper spring seat
    125—ride spring
    128—lower spring seat The following paragraphs describe various prior-art features of damper designs, including both monotube (single tube) and twin-tube designs; any of these features can be combined with any of the embodiments disclosed herein for telescopic dampers 101, suspension systems 100, or wheel assemblies 150 comprising them.

In some dampers 101, such as, for example, some monotube dampers, either the upper volume 103 or the lower volume 104 houses a compressible fluid such as, for example, nitrogen gas. In some prior art dampers 101, such as, for example, some twin-tube dampers, either or both of the upper volume 103 and the lower volume 103 houses a non-compressible fluid such as, for example a damper oil.

In embodiments, the ride spring 125 is a compression spring. In some suspension systems, a ride spring can provide a progressively stiffer ride when engaged, e.g., when vehicle load is higher. In some suspension systems, other elements, such as, for example, leaf springs or pneumatic arrangements, are used in place of the coil springs illustrated. Where coil springs are described or illustrated herein in the disclosed embodiments, they are intended as non-limiting examples that can be replaced in any embodiment by other biased and/or resilient elements.

In some dampers 101, a rebound striker 112 is implemented as a cap or similar device provided, inter alia, to protect a seal at the top of the damper tube, such as, for example, a rod seal (not shown) where the damper rod 115 enters the damper tube 110.

In some dampers 101, a base valve 118 is provided to direct oil flow into an outer tube (if present, in a twin tube configuration) during compression, contributing to the damping rate. During rebound, oil returns from the reservoir to the main chamber via a check valve (not shown). In some dampers 101, a piston valve 119 is provided for flow of oil from one chamber to another. (Note: the term 'piston valve' is used herein to broadly include the piston comprising the valves and not just the valves installed in the piston.) For example, in a monotube damper not having an outer (reservoir) tube, oil capacity of the cylinder is adaptable to the stroke; when the piston rod 115 is pushed in on the bump stroke, oil below the piston valve 119 is forced to flow through from the lower chamber 104 to the upper chamber 103, generating bump damping. On the rebound stroke, when the piston rod 115 is pulled out, the oil between piston valve 119 and guide is forced to flow through the piston, generating rebound damping. At the same time, part of the piston rod 115 emerges from the cylinder 110 and the piston valve 119 will move upwards.

In some dampers 101, the top mount 121 and lower mount 122 are provided for connecting the telescopic damper 101, e.g., to suspension arms of the wheel assembly 150 (not shown).

In some dampers 101, the upper spring seat 124 is fixed to the damper rod 115 and the lower spring seat 128 is fixed to the damper body 110.

In a non-limiting example, as the damper 101 is compressed towards a bump condition (FIG. 1C) oil (not shown) is forced past the piston valve 119 into the upper chamber 103 of the damper 101, the damper rod 115 entering the upper chamber 103 takes up additional volume within the damper body 110, and this volume increase is taken up within the compressible fluid and a small amount of oil is passed through the base valve 118. As the damper extends towards a rebound condition (FIG. 1A), the oil is again forced past the piston valve 119 but this time into the lower chamber 104. As the damper rod 115 exits the damper body 110, the compressible gas forces additional oil through the base valve 118 to compensate for the volume change. Altering the piston valve 119 and the base valve 115 enables variations in the bump and rebound damping characteristics.

Figure 2:
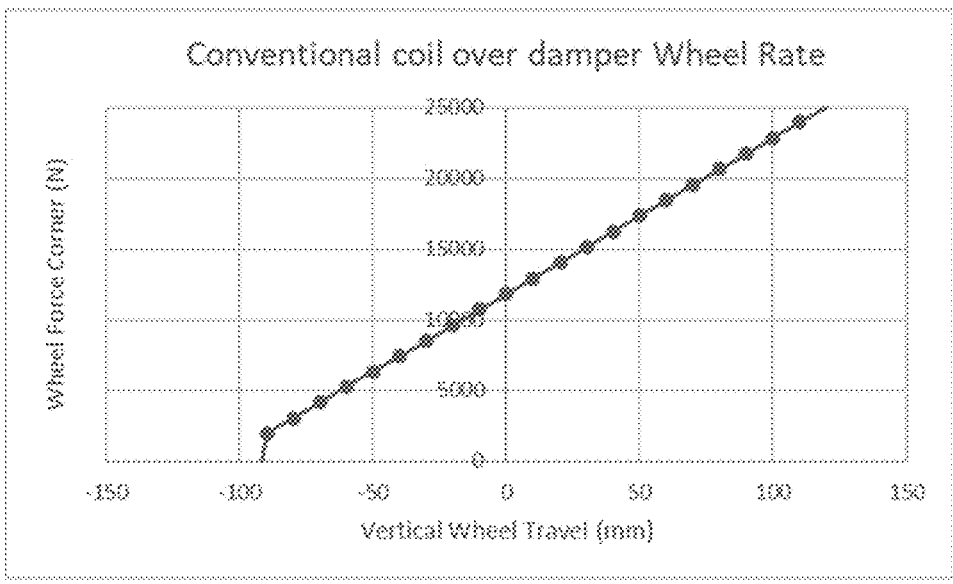
FIG. 2 shows a wheel rate graph of a prior-art telescopic damper.

FIG. 2 shows an exemplary wheel rate curve for a prior art suspension system, e.g., a suspension system similar to that represented by the schematic illustrations of FIGS. 1A-C. Specifically, FIG. 2 shows a a quasi-static wheel rate graph of a prior-art telescopic damper and ride spring combination, such as a conventional coil over damper, the rate coming from the ride spring until the damper's rebound stop is hit at full rebound. The wheel rate is the slope of a curve plotting wheel force (e.g., in N) vs wheel travel (e.g., in mm) and is a measure of the effective stiffness of the suspension system, measured at the wheel center. A higher wheel rate (steeper wheel rate curve) is stiffer, and a lower wheel rate (less steep wheel rate curve) is softer, i.e., less stiff. As can be seen in FIG. 2, a wheel rate associated with the prior art telescopic damper of FIGS. 1A-C (the slope of the curve) is constant, meaning that the suspension has a constant stiffness throughout the range of vertical wheel travel.

The illustrative wheel rate curves in this disclosure relating to suspension stiffness in a driving (not kneeling) mode assume a suspension system with +110 mm of vertical wheel travel in the bump region of the graph and 90 mm of vertical wheel travel in the rebound region of the graph, from a design ride height (shown in the graphs as 0 (zero) vertical wheel travel on the x-axis. These parameters are illustrative only, and other vertical height ranges are possible in different designs.

We now refer to FIGS. 3A, 3B, 3C, 3D and 4.

FIGS. 3A-D illustrate an exemplary prior art design in which a rebound spring 105 is provided in the upper chamber of the telescopic damper 101 above the rebound stop 117 to change a characteristic of the suspension system 100. Presence of the rebound spring 105 is known to change a stiffness coefficient, i.e., to cause ride stiffness of the suspension system to increase, beyond a fixed, i.e., predetermined, extension length of the damper 101.

Figure 3A:
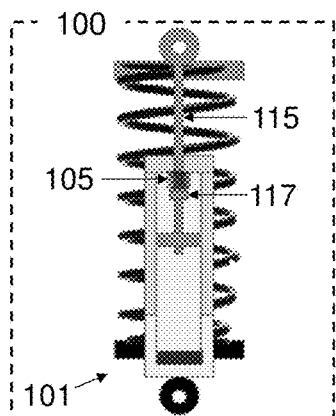
FIGS. 3A-D are schematic elevation-view drawings of a suspension system comprising a prior-art telescopic damper having a rebound spring disposed therein; the four views correspond to full rebound, a fixed knee point in a wheel rate curve, design ride height, and full bump height, respectively.
Figure 3B:
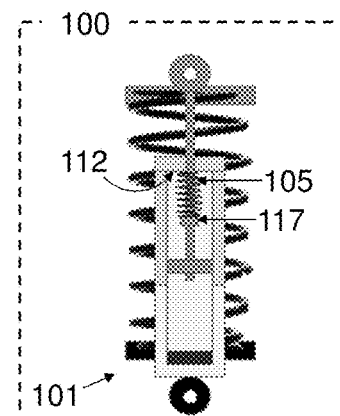
Figure 3C:
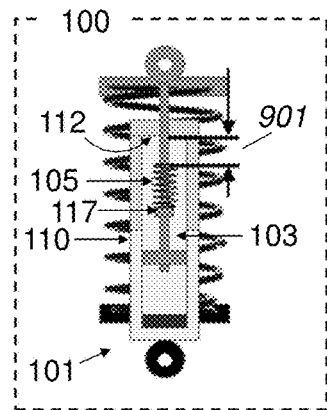
Figure 3D:
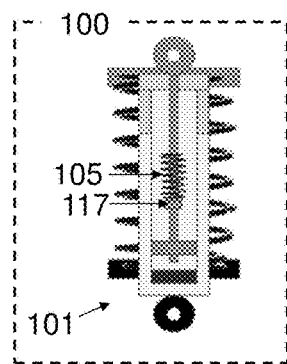

The rebound spring 105 can be arranged so that there is a predetermined gap between the top of the rebound spring 105 and the top of the damper cylinder 110, e.g., between the top of the rebound spring 105 and the rebound striker 112 at the top of the damper cylinder 110. An example of a design gap 901 is illustrated in FIG. 3C, the gap 901 representing the linear distance between the top of the rebound spring 105 and the rebound striker 112 at the top of the damper cylinder 110. As can be seen in FIG. 3D, there is a larger gap (than design gap 901) between the rebound spring 105 and the rebound striker 112 at maximum bump stroke, and the rebound spring is not engaged (compressed) at that point. In FIG. 3C, representing a design ride height, the rebound spring is also shown as not being engaged, as described earlier. FIG. 3B shows the rebound spring 105 start to be engaged on the rebound stroke, when the damper 101 reaches a predetermined length that corresponds, a priori, to the design gap 901—in other words, the design gap 901 can be selected to determine the point (e.g., damper length in the rebound stroke) at which the rebound spring 105 engages and begins to be compressed. At full rebound, represented in FIG. 3A, the rebound spring 105 is greatly compressed as the damper 101 reaches maximum extension, as far is allowed by the presence of the rebound spring 105 intervening between the rebound stop 117 and the rebound striker 112.

Figure 4:
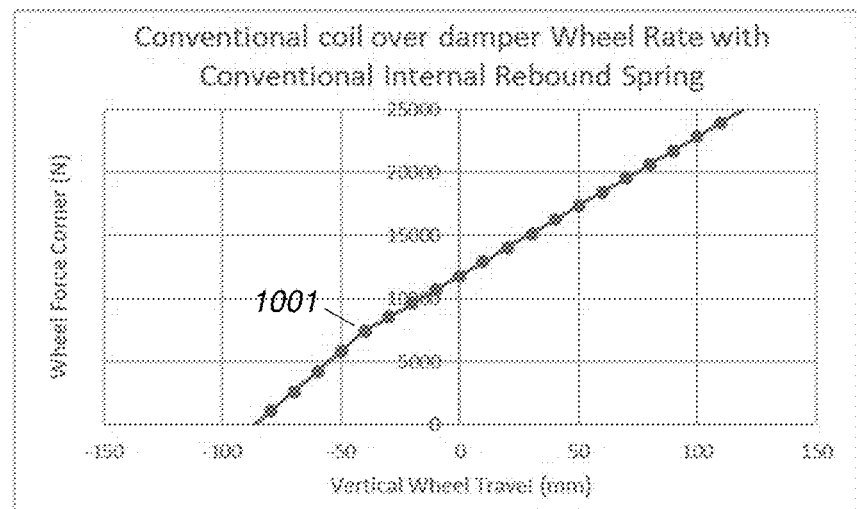
FIG. 4 shows a wheel rate graph of a prior-art telescopic damper comprising an internal rebound spring.

FIG. 4 shows a graph of an exemplary wheel rate curve corresponding to the telescopic damper 101 of FIGS. 3A-D. Specifically, FIG. 4 shows a quasi-static wheel rate graph of a prior-art telescopic damper comprising an internal rebound spring and ride spring combination, such as a conventional coil over damper with rebound spring. The knee point at which the wheel rate changes, indicated in FIG. 4 by arrow 1001, corresponds to the point in the rebound stroke, illustrated in FIG. 3B, at which the rebound spring 105 engages, i.e., begins to be compressed so as to stiffen the remainder of the rebound stroke. The location of the knee point 1001 on the wheel rate curve, i.e., the wheel travel value at which the wheel rate changes, is determined by fixing the gap 901 in light of other parameters and dimensions of the telescopic damper 101. In prior art systems, the location of the knee point is fixed, given that the gap 901 is factory-set and cannot be changed on the fly.

In accordance with embodiments disclosed herein, it can be desirable to dynamically change the location of the knee point of the wheel rate curve, i.e., to change the wheel travel value at which the wheel rate changes. This allows control of when (at what wheel-travel value) vehicle ride stiffness changes in the rebound stroke. Such control can be used, inter alia, to change ride characteristics and/or vehicle-handling balance between comfort (less stiff) and performance/responsiveness (more stiff).

Figures 5, 6:
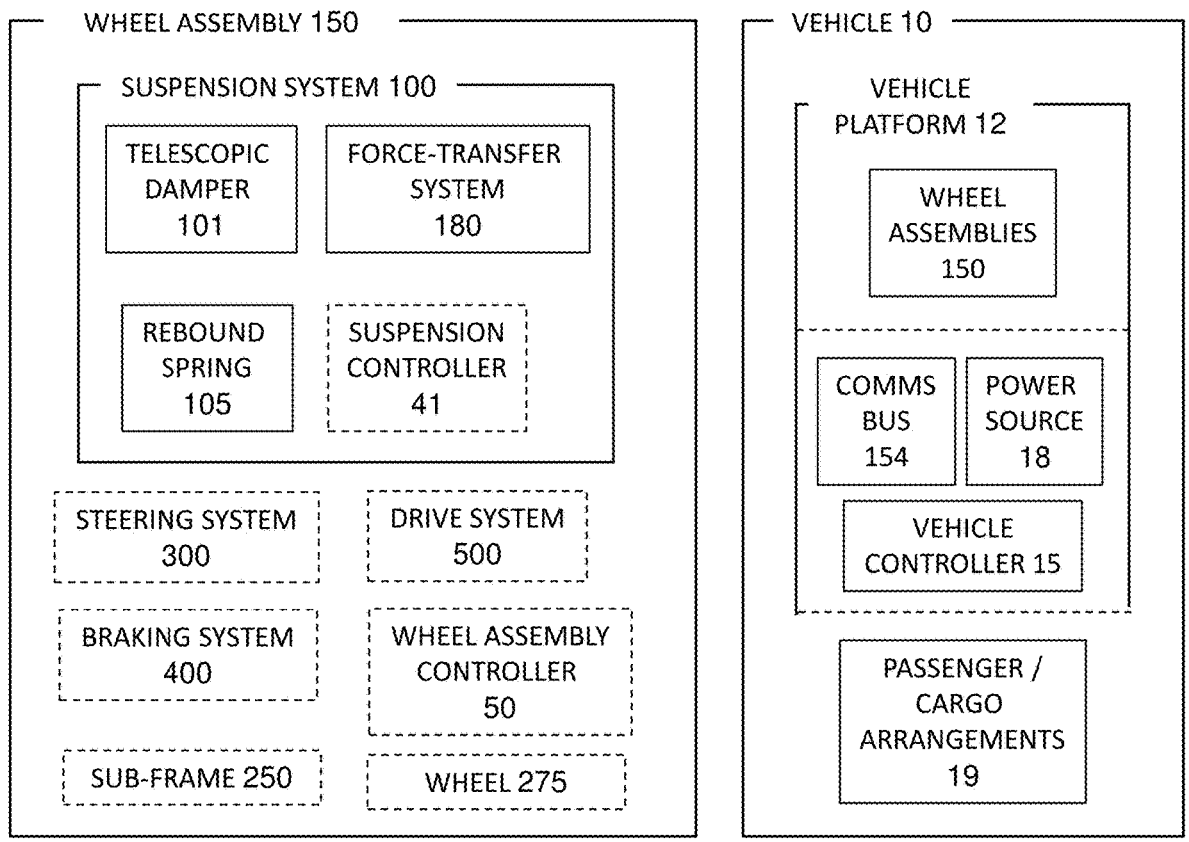
FIG. 5 shows a block diagram of a wheel assembly comprising a suspension system according to embodiments of the present invention.
FIG. 6 shows a block diagram of a vehicle comprising a wheel assembly that includes a suspension system according to embodiments of the present invention.

We now refer to FIGS. 5, 6, 7 and 8. FIGS. 5 and 6 show block diagrams of, respectively, a wheel assembly 150 comprising a suspension system 100 according to embodiments, and a vehicle 10 comprising such wheel assemblies 150. Throughout the disclosure and the accompanying figures, elements edged in dashed lines are not necessarily present in every implementation of an embodiment.

According to embodiments, a suspension system 100 comprising a telescopic damper 101 and a rebound spring 105 also includes a force-transfer system 180 operative to apply a force to change one or more parameters of the suspension system 100.

Achieving additional roll stiffness by providing a rebound spring 105 can help optimize a vehicle's roll gradient and handling balance with less compromise to comfort. According to embodiments, the rebound function can be adaptively controlled to act at different positions in the suspension travel. For example, for improved comfort during straight-line driving, the rebound spring function, i.e., the increase of stiffness during the rebound stroke of the suspension system, can be moved further away from design vehicle ride height, to aid a 'magic carpet' effect, reducing body movement and head-toss. During cornering events or spirited driving over uneven roads, the rebound spring 105 could be made to engage sooner to reduce body roll and harsh suspension top-out impacts. In contrast, modes retracting the rebound spring, e.g., increasing the gap 901 to remove the additional stiffness in rebound stroke, can contribute to optimizing traction over uneven, loose or soft ground by reducing variations in wheel load to maintain more balanced ground pressures at each tire contact patch, e.g., due to a lower articulation stiffness.

Examples of specific force-transfer systems 180 are described hereinbelow with reference to other figures. In some embodiments, the one or more changed parameters are mode-specific; in other words, the force-transfer system 180 changes a first one or more parameters of the suspension system 100 in a first mode, e.g., operating mode of driving mode, of the suspension system 100 or of a wheel assembly 150 comprising the suspension system 100, or of a vehicle 10 comprising a plurality of wheel assemblies 150 comprising such suspension systems 100, and changes a second one or more parameters of the suspension system 100 in a second mode. In some designs, the suspension system 100 comprises an electronics array that includes a suspension controller 41. The suspension controller 41 can be programmed to control one or more functions of the suspension system 100, including, for example, one or more functions of the force-transfer system 180, such as, for example, regulating the one or more parameters of the suspension system 100. The suspension controller 41 can also be configured to record and store historical operating and maintenance data relating to the suspension system 100.

According to embodiments, and with reference to FIG. 5, a wheel assembly 150 includes additional subsystems such as one or more of: a steering system 300, a braking system 400, and a drive system 500. In some embodiments, the wheel assembly 150 includes a sub-frame 250 mountable to the vehicle platform 12 and/or a wheel 275. In some embodiments, the wheel assembly 150 includes a wheel assembly controller 50. In some designs, a wheel-assembly controller 50 performs some or all of the functions of a dedicated suspension controller 41 which may or may not be present as well. In some designs, some of the control functionality with respect to the suspension system 100 can be shared and/or duplicated for redundancy purposes, with a dedicated suspension controller 41.

A vehicle platform 12 comprises a plurality of wheel assemblies 150 according to the embodiments disclosed herein and serves as a component of a vehicle 10. A vehicle 10 can additionally include passenger arrangements such as seats and passenger-comfort accessories such as, without limitation, air-conditioning and heating, lighting, sound system, windshield wipers, etc., and/or cargo arrangements such as, for example, shelves or compartments. As indicated by the dashed lines in FIG. 6, any of the following elements can be installed in/on the vehicle platform 12 and/or elsewhere in the vehicle 10, depending on specific design choices: a communications bus 154 connecting wheel assemblies 150 and/their respective components, including respective controllers such as suspension controller 41 and/or wheel-assembly controllers 50; one or more power sources 18 for powering vehicle motion and/or other vehicle functions (e.g., air conditioning) and/or wheel-assembly subsystems 100, 300, 400, 500; and a vehicle controller 15.

Figure 7:
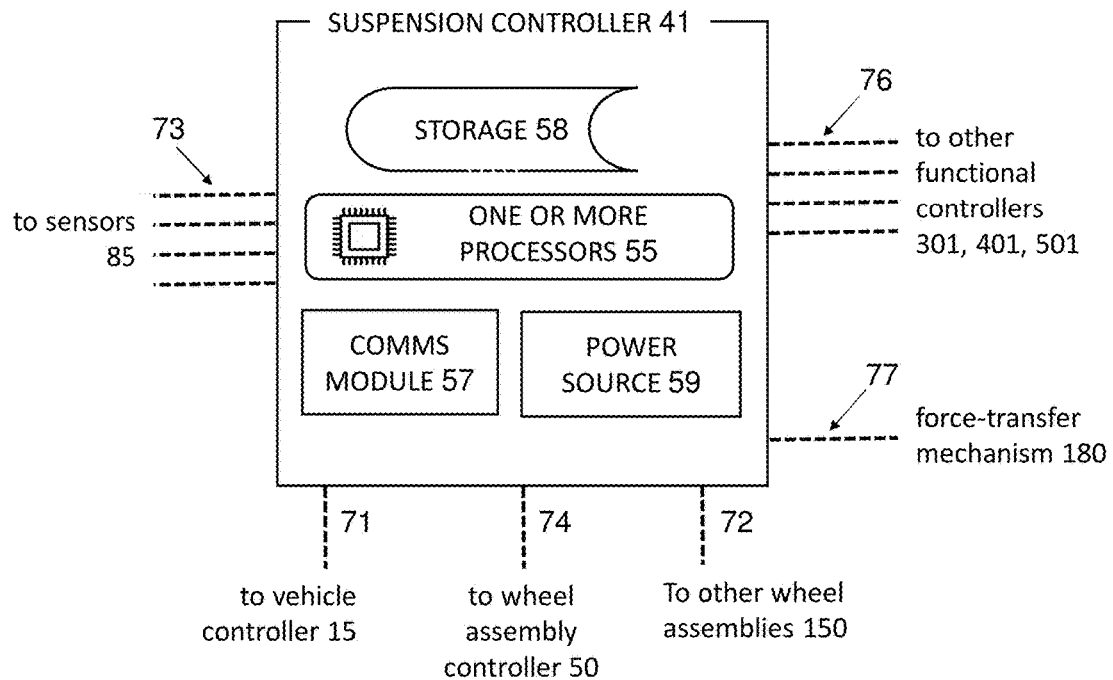
FIGS. 7 and 8 are schematic diagrams of, respectively, a suspension controller and a wheel-assembly controller, according to embodiments of the present invention.

A suspension-system controller 41 according to embodiments is illustrated schematically in FIG. 7 to show selected components. The exemplary suspension-system controller 41 of FIG. 7 includes one or more computer processors 55, a computer-readable storage medium 58, a communications module 57, and a power source 59. The computer-readable storage medium 58 can include transient and/or transient storage, and can include one or more storage units, all in accordance with desired functionality and design choices. In embodiments, the storage 58 can be used for one or more of: storing program instructions in firmware and/or software for execution by the one or more processors 55 of the suspension-system controller 41; and historical operating data and/or maintenance data relating to the suspension system 100 and/or any one or more of its sub-systems and components. The communications module 57 can be configured to establish communications links with any one or more of: a vehicle-onboard vehicle controller 15 via communications arrangements 71; a wheel-assembly controller 50 via communications arrangements 74; respective wheel-assembly controllers 50 or respective suspension system controllers 41 of other wheel assemblies 150 (of the same vehicle 10) via communications arrangements 72; the force-transfer system 180 via communications arrangements 77; respective functional controllers 301, 401, 501 of subsystems within the wheel assembly 150 such as one or more of: a steering system 300, a braking system 400, and a drive system 500, via communications arrangements 76; and sensors 155 e.g., sensors 155 located in/on the suspension system 100 or elsewhere within the wheel assembly 150, via communications arrangements 73. Not every suspension-system controller 41 includes all of the components and/or communications arrangements shown in FIG. 7.

Figures 8, 9:
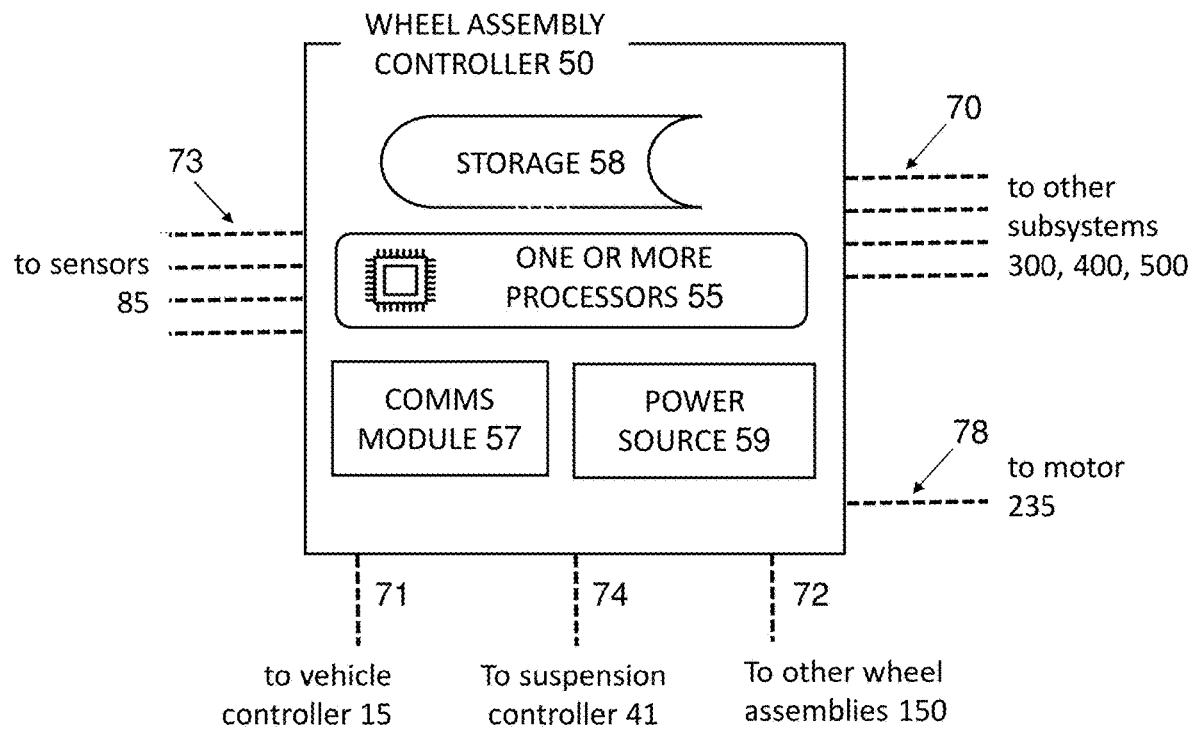
FIG. 9 shows a flowchart of a method for operating a vehicle according to embodiments of the present invention.

A wheel-assembly controller 50 according to embodiments is illustrated schematically in FIG. 8. The exemplary wheel-assembly controller 50 of FIG. 8 includes one or more computer processors 55, a computer-readable storage medium 58, a communications module 57, and a power source 59. The computer-readable storage medium 58 can include transient and/or transient storage, and can include one or more storage units, all in accordance with desired functionality and design choices. In embodiments, the storage 58 can be used for any one or more of: storing program instructions, in firmware and/or software, for execution by the one or more processors 55 of the wheel-assembly controller 50; and historical operating data and/or maintenance data relating to the wheel assembly and/or any one or more of its sub-systems and their components. The communications module 57 can be configured to establish communications links with a vehicle-onboard vehicle controller 15 via communications arrangements 71; suspension controller 41 via communications arrangements 74; respective wheel-assembly controllers 50 or respective functional controllers 41, 301, 401, 501 of subsystems within other wheel assemblies 150 such as one or more of: a suspension system 100, a steering system 300, a braking system 400, and a drive system 500, via communications arrangements 72, same-wheel-assembly subsystems 300, 400, 500 including respective sub-system control units 301, 401, 501, via communications arrangements 70; a drive motor 235 via communications arrangements 78; and sensors 85 e.g., sensors 85 located in/on the wheel assembly 150, via communications arrangements 73. Not every wheel-assembly controller 50 includes all of the components and/or communications arrangements shown in FIG. 8.

In embodiments, a suspension system 100 comprising a telescopic damper 101, a rebound spring 105 and a force-transfer system 180 is operative to apply a force to change one or more parameters of the suspension system 100 in a first operating mode. Changing the one or more parameters in the first operating mode includes changing a length of the telescopic damper 101—for example, shortening the telescopic damper 101, so as to kneel a vehicle at the respective wheel assembly in the first operating mode. An example of a first operating mode is one in which a vehicle is not traveling, i.e., at zero velocity, or is traveling at a velocity very close to zero, e.g., <1 km/h, or <2 km/h, or <3 km/h, or <4 km/h, or <5 km/h. In such a mode, the vehicle may be positioned for allowing passengers to get on and/or off, or for loading or unloading cargo. A kneeling function is one in which a vehicle, or at least a respective corner of a vehicle corresponding to a respective wheel assembly, is lowered, e.g., to be even with a sidewalk curb so that mobility-challenged persons or cargo-loaders (or unloaders) are faced with traversing, at best, a level surface, or, at worst, a ramp, either of which possibilities eliminate one or more stairs that they would need to ascend or descend. In embodiments, the force-transfer system is effective to transfer and apply a force to accomplish the kneeling function by.

In some embodiments, a vehicle platform 12 comprises a plurality of wheel assemblies 150, each wheel assembly comprising a telescopic damper 101, a rebound spring 105 and a force-transfer system 180 operative to kneel a vehicle 10 at the respective wheel assembly 150. In some such embodiments, the respective suspension controllers 41 and/or respective wheel-assembly controllers 50 of the plurality of wheel assemblies 150 are in communication with each other and/or with a controller 15 of the vehicle platform, to jointly cause the vehicle 10 to kneel at all of the wheel assemblies 150 of the plurality of wheel assemblies 150.

In some embodiments, a suspension system 100 comprising a telescopic damper 101, a rebound spring 105 and a force-transfer system 180 is operative to apply a force to change one or more parameters of the suspension system 100 in a second operating mode. Changing the one or more parameter in the second operating mode includes changing a wheel rate of the wheel assembly 150—for example, over a selected range of wheel-travel values of the wheel assembly 150. The force-transfer system 180 is controllable, e.g., by a suspension controller 41 or a wheel assembly controller 50, to modify the wheel-travel value at which the wheel rate of the wheel assembly changes in the second mode of suspension operation, i.e., to dynamically move the 'knee point' of the wheel rate curve in response to control system instructions.

In some embodiments, a vehicle platform 12 comprises a plurality of wheel assemblies 150, each wheel assembly comprising a telescopic damper 101, a rebound spring 105 and a force-transfer system 180 operative to modify the wheel-travel value at which the wheel rate of the wheel assembly 150 changes in the second mode of suspension operation. In some such embodiments, the respective suspension controllers 41 and/or respective wheel-assembly controllers 50 of the plurality of wheel assemblies 150 are in communication with each other and/or with a controller 15 of the vehicle platform, to jointly modify the wheel-travel value at which the wheel rate of the wheel assembly 150 changes in multiple wheel assemblies 150 of the plurality of wheel assemblies 150. In an non-limiting example, the controllers are jointly operable to regulate the wheel rate at two front wheel assemblies.

Referring now to FIG. 9, a method is disclosed for operating a vehicle 10, e.g., the vehicle 10 of FIG. 6, comprising a vehicle platform 12 that includes a plurality of wheel assemblies 150, e.g., the wheel assemblies 150 of FIG. 5. Each wheel assembly of FIG. 5 comprises a suspension system 100 that includes a telescopic damper 101, a rebound spring 105, and a force-transfer system 180 operative to apply a force to change one or more parameters of the respective suspension system 100. In some embodiments, the method is carried out by a suspension controller 41 and/or by a wheel-assembly controller 50. As illustrated by the flow chart in FIG. 9, the method comprises the two method steps S01 and S02:

Step S01: kneeling the vehicle 10 at a respective wheel assembly 150 by applying a force to shorten the telescopic damper 101. In some embodiments, the velocity of the vehicle 10 is zero, or substantially zero, e.g., <1 km/h, or <2 km/h, or <3 km/h, or <4 km/h, or <5 km/h, during Step S01. In some embodiments, one or more suspension controllers 41 and/or one or more wheel-assembly controllers 50 and/or a vehicle controller 15 coordinate the control of multiple respective force-transfer systems 180 to shorten the respective telescopic dampers 101 of the respective suspension systems 100 of multiple wheel assemblies 150 so as to kneel the vehicle 10 at the multiple wheel assemblies 150.

Step S02: modifying a wheel-travel value at which the wheel rate of the respective wheel assembly 150 changes, by controlling application of a force to change one or more parameters of a suspension system 100. In some embodiments, controlling the application of the force includes controlling the displacement of one or more components of the suspension system. In some embodiments, the one or more parameters of the suspension system 100 changed in Step S02 includes a wheel-travel value at which the rebound spring 105 is engaged. In some embodiments, Step S02 is carried out by controlling the force-transfer system 180 to modify a wheel-travel value at which the wheel rate of the wheel assembly 150 changes. In some embodiments, Step S02 is carried out by controlling the force-transfer system 180 to modify a wheel-travel value at which—i.e., above which—the wheel rate of the wheel assembly 150 decreases, i.e., decreases as vertical wheel travel increases, such that the wheel rate is lower above the knee-point wheel-travel value. In some embodiments, the velocity of the vehicle 10 is nonzero during Step S02. In some embodiments, each one of the respective force-transfer systems 180 of each wheel assembly 150 of the plurality of wheel assemblies 150 is individually controllable to change a respective wheel-travel value at which a wheel rate of the wheel assembly 150 changes. In some embodiments, one or more suspension controllers 41 and/or one or more wheel-assembly controllers 50 and/or a vehicle controller 15 coordinate the control of multiple respective force-transfer systems 180 to change the respective wheel-travel value for multiple wheel assemblies 150.

Figure 10A:
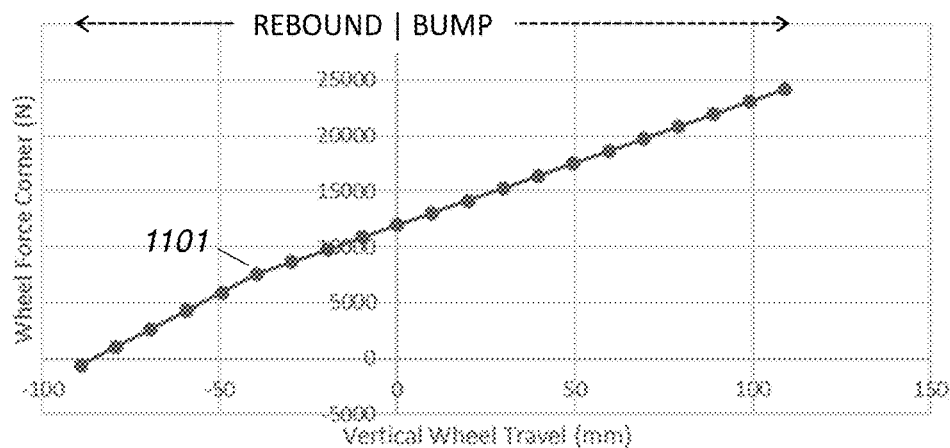
FIGS. 10A-C show wheel rate graphs of a telescopic damper, respectively with the knee point at a nominal position respective of a design ride height, with the knee point moved in a first direction, and with the knee point moved in a second direction, according to embodiments of the present invention.
Figure 10B:
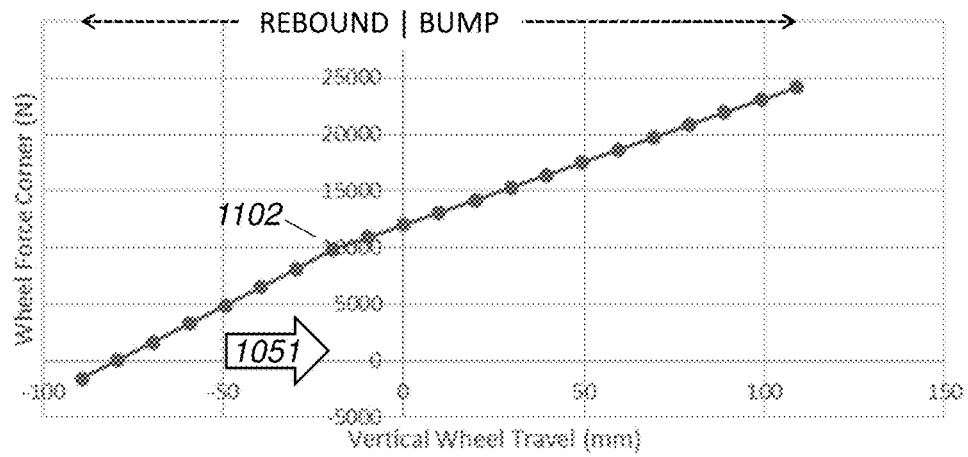
Figure 10C:
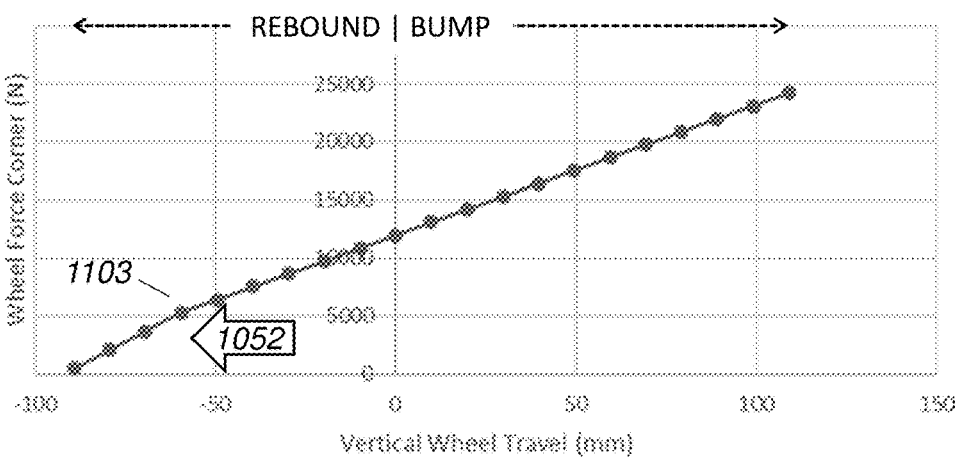

FIGS. 10A, 10B and 10C illustrate the modifying, with respect to a suspension system 100 comprising a telescopic damper 101, a rebound spring 105, and a controllable force-transfer system 180, of a wheel-travel value at which the wheel rate of the respective wheel assembly 150 changes due to a force applied by the force-transfer system 180. The specific wheel-rate curves, including values for wheel travel, wheel force and 'knee points' are shown for illustrative purposes, and the values shown are not intended to define or limit any of the embodiments.

FIG. 10A shows an exemplary wheel rate curve for a suspension system 100 arranged to have a 'knee point,' indicated by arrow 1101, at −40 mm of vertical wheel travel in the rebound stroke, i.e., the rebound (negative) region of the graph. The wheel-rate curves illustrated herein show the knee point, the wheel-travel value at which the wheel rate of the wheel assembly 150 decreases, as negative because it can be desirable to configure a suspension system to be stiffer in the rebound (negative) region of the graph. Nonetheless, in some embodiments, the knee point is at a positive wheel-travel value, such that greater stiffness is available already in the bump (positive) region of the graph.

FIG. 10B shows the wheel-rate curve resulting from a first change made by the force-transfer system of the suspension system 100 represented in FIG. 10A. The change includes changing the wheel-travel value at which the wheel changes from −40 mm to −20 mm, shifting the knee point to the right, as indicated in FIG. 10B by arrow 1051. The new knee point on the resulting wheel rate curve is indicated by arrow 1102 and is still in the rebound (negative) region of the graph. As a result of the shift in knee point, the suspension system 100 becomes stiffer more quickly in the rebound stroke.

FIG. 10C shows the wheel-rate curve resulting from a second change made by the force-transfer system of the suspension system 100 represented in FIG. 10A. The change includes changing the wheel-travel value at which the wheel changes from −40 mm to −60 mm, shifting the knee point to the left, as indicated in FIG. 10C by arrow 1052. The new knee point on the resulting wheel rate curve is indicated by arrow 1103 and is further into the rebound (negative) region of the graph. As a result of the shift in knee point, the suspension system 100 remains softer (less stiff) further into the rebound stroke.

Referring again to FIG. 9, Step S01 of the method is carried out at a first time, and Step S02 is carried out at a second time, i.e., a different time that Step S01, which can be later or earlier. Each of the two steps relates to a different operating mode of the suspension system 100 or of the vehicle 10, and they cannot be carried out simultaneously.

In some embodiments, each one of the respective force-transfer systems 180 of each wheel assembly 150 of the plurality of wheel assemblies 150 is individually controllable to change a respective wheel-travel value at which a wheel rate of the wheel assembly 150 changes. In some embodiments, one or more suspension controllers 41 and/or one or more wheel-assembly controllers 50 and/or a vehicle controller 15 coordinate the control of multiple respective force-transfer systems 180 to change the respective wheel-travel value for multiple wheel assemblies 150.

In some embodiments, it can be desirable to coordinate the control of the wheel rate of suspension systems 100 of a selected subset of the plurality of wheel assemblies 150. In a non-limiting, illustrative example, two front wheel assemblies 150 of a vehicle 10 are controlled to operate in a driving mode according to a 'stiffer' wheel rate curve such as, for example, the wheel rate curve of FIG. 10B, while two rear wheel assemblies 150 of the same vehicle 10 are controlled to operate in the same driving mode according to a 'softer' wheel rate curve such as, for example, the wheel rate curve of FIG. 10C.

The following sections illustrate three examples of a force-transfer system according to embodiments, along with respective damper and rebound spring arrangements corresponding to each force-transfer system example.

First Example of a Force-Transfer System

A first, non-limiting example of a suspension system 100 comprising a force-transfer system 180 (as shown in the block diagram of FIG. 5) is illustrated schematically in FIGS. 11A, 11B, 12A and 12B.

Figure 11A:
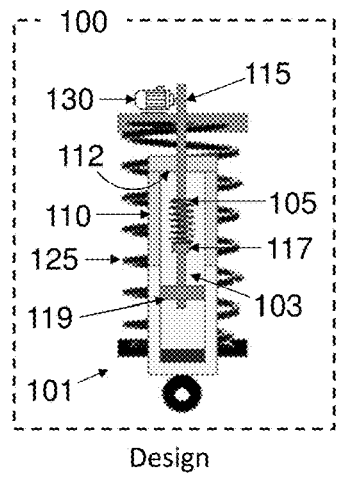
FIGS. 11A-B show a suspension system comprising a telescopic damper having a rebound spring disposed therein and a force-transfer system comprising a mechanical actuator, the two views corresponding respectively to a design ride height and a knelt height, according to embodiments of the present invention.

According to the first example, the rebound spring 105 is disposed within the telescopic damper 101. As shown in FIG. 11A, the rebound spring 105 is disposed in the upper chamber 103 of damper body 110, i.e., surrounding the damper rod 115 above the piston valve 119. In some embodiments, the rebound spring 105 is arranged above the rebound stop 117, if present.

The force-transfer system 180 of the first example includes a mechanical actuator, e.g., an electrically powered mechanical actuator powered by electric motor 130, installed in the top mount 121 and thereby in communication with the damper rod 115. (The actuator itself is internal to the top mount 121 and therefore not shown.) The actuator in the top mount 121 can include any type of actuator for applying a force to the damper rod 115 to produce vertical movement, such as a linear actuator or a lead screw. The electric motor 130 can be powered by any power source 18 located in the wheel assembly 150 or the vehicle platform 12/vehicle 10.

Figure 11B:
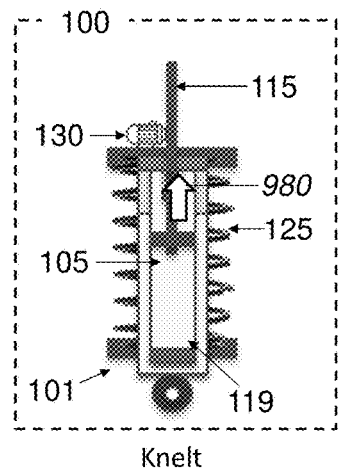

FIG. 11B illustrates operation of the suspension system 100 of FIG. 11A in a kneeling mode that corresponds to Step S01 of FIG. 9. The mechanical actuator, powered by the electric motor 130, drives the damper rod 115 up into the damper body 110, as indicated by arrow 980. Driving the damper rod 115 shortens the overall length of the damper 101, to thereby lower the vehicle so as to kneel at the corresponding wheel assembly 150. In some embodiments, the ride spring 125 (or functional equivalent) is compressed to a desirable length, by a combination of the vehicle's weight and the mechanical actuator 130, as shown in FIG. 11B. In this operating mode, the rebound spring 105 is not necessarily engaged at any point.

Figure 12A:
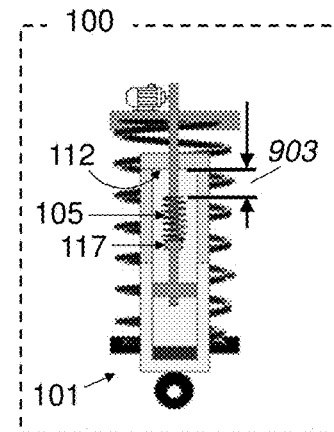
FIGS. 12A-B show a suspension system comprising a telescopic damper having a rebound spring disposed therein and a force-transfer system comprising a mechanical actuator, the two views corresponding respectively to a design ride height respective of a first knee point in a wheel rate curve and a design ride height respective of a changed knee point in the wheel rate curve, according to embodiments of the present invention.
Figure 12B:
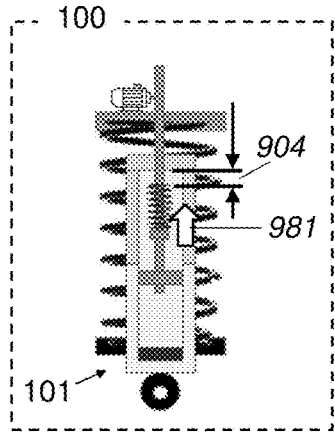

Referring now to FIGS. 12A and 12B, operation of the suspension system 100 is illustrated in an operating mode that corresponds to Step S02 of FIG. 9. FIG. 12A.

The damper 101—which can be the same damper as the one illustrated in FIG. 11A—is shown schematically in FIG. 12A as being tuned to a design ride height by setting the gap between the top of the rebound spring 105 and the rebound striker 112 to a predetermined gap-length 903. The predetermined gap-length 903 corresponds to the desired vertical wheel travel value of the knee point in the wheel rate curve of the suspension system 100. In other words, on the rebound stroke, the rebound spring 105 is engaged, i.e., begins to undergo compression between the rebound stop 117 and the rebound striker 112, at a vertical wheel-travel value corresponding to a desired knee point in the wheel rate curve.

The ability of the force-transfer system 180 (in this example, the mechanical actuator in communication with the damper rod 115) to change a knee point of a wheel rate curve is illustrated in FIG. 12B. As indicated by arrow 981, the actuator has raised the damper rod 115 so as to reduce the gap-length 903 at the original design ride height shown in FIG. 12A, to a new design ride height wherein the gap length between the rebound stop 117 and the rebound striker 112 has been reduced to gap-length 904. This change means that the rebound spring 105 engages earlier in the rebound stroke, and the net result is that the reduced gap-length 904 moves the knee point to the right, i.e., increases stiffness in a larger segment of the rebound stroke; this change is analogous to the change in the knee point from FIG. 10A to FIG. 10B. According to the illustrated example, the increased stiffness applies to at least 5 mm of additional vertical wheel travel, or at least 10 mm of additional vertical wheel travel, or at least 15 mm of additional vertical wheel travel, or at least 20 mm of additional vertical wheel travel, or at least 25 mm of additional vertical wheel travel, or at least 30 mm of additional vertical wheel travel, or at least 35 mm of additional vertical wheel travel, or at least 40 mm of additional vertical wheel travel.

Second Example of a Force-Transfer System

A second, non-limiting example of a suspension system 100 comprising a force-transfer system 180 (as shown in the block diagram of FIG. 5) is illustrated schematically in FIGS. 13, 14, 15, 16, 17A, 17B, 17C, 19A and 19B.

Figure 15:
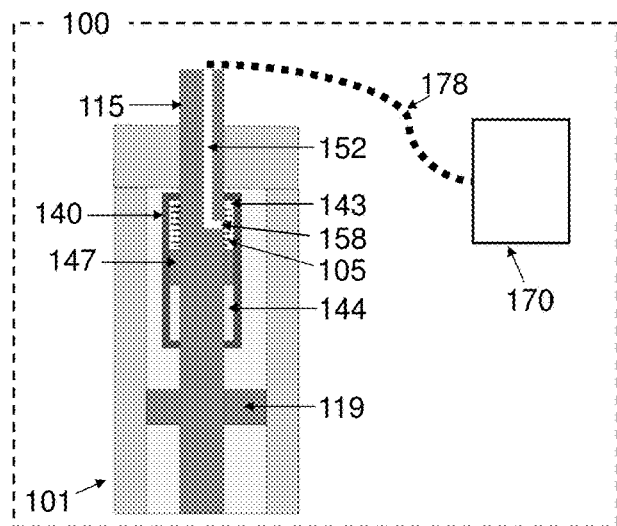
FIG. 15 is a partial schematic elevation-view drawing of a telescopic damper comprising an internal rebound cylinder, showing a fluid channel in communication with a single chamber of the internal cylinder, according to embodiments of the present invention.

The force-transfer system 180 of the second example includes an external hydraulic system 170, as shown schematically in FIG. 15.

According to the second example, the rebound spring 105 is disposed in a separate cylinder within the damper body, and this separate cylinder can be actuated via an external hydraulic circuit to alter its position within the main damper body 110, which in turn alters the rebound spring's contact point when referenced to the overall stroke of the damper 101. The adaptive rebound spring function provides additional stiffness that acts between the damper rod 115 and the damper body 110, and the position at which the rebound spring 105 engages, along with contribution during the suspension stroke, is controllable. In embodiments, the kneeling function uses this same mechanism to provide control of the damper length, thereby possessing the ability to lower the vehicle's ride height when energized while retaining a failsafe position of normal, not kneeled, ride height.

Figure 13:
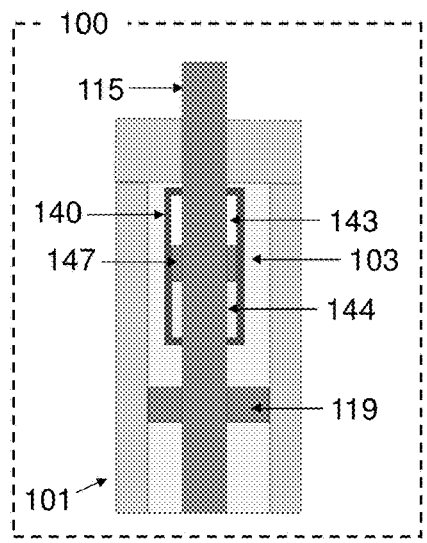
FIG. 13 is a partial schematic elevation-view drawing of a telescopic damper comprising an internal rebound cylinder defining respective active and dead chambers of the internal cylinder, according to embodiments of the present invention.

The suspension system 100 according to the second example includes an internal rebound cylinder 140 disposed within the upper chamber 103 of the damper body 110. The rebound stop cylinder 140 is effective to transmit rebound spring stiffness to the damper 101. Referring to FIG. 13, which schematically illustrates a detail of the suspension system 100 according to the second example, the internal rebound cylinder 140 is divided into two chambers by the rebound piston 147: an upper chamber 143 and a lower chamber 144. Each chamber can hold a fluid with the rebound piston 147 sealing between the two chamber 143, 144, such as, for example, an incompressible fluid such as a hydraulic fluid or a compressible fluid such as an inert gas. In some embodiments, one of the chambers 143, 144 is 'active' in that an internal pressure in that chamber is controllable—in the instant design it is controllable from outside the telescopic damper 101. In some embodiments, both chambers 143, 144 can be active. In those embodiments in which only one chamber is active, the other one of the two chambers is called a 'dead' chamber.

The rebound piston 147 travels vertically with the damper rod 115 and is constrained by the internal rebound cylinder 140. In embodiments, the rebound piston 147 is a type of rebound stop having one or more additional features, e.g., a fluid-tight seal around the circumference.

Figure 14:
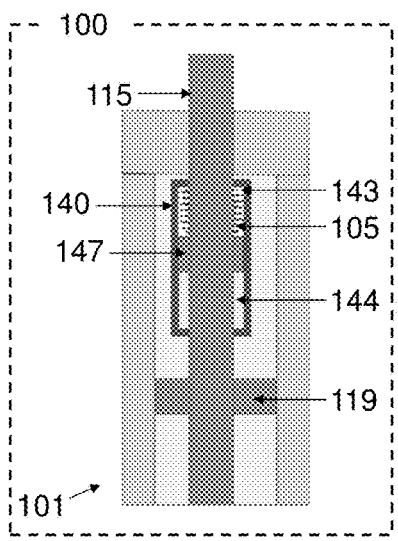
FIG. 14 shows the telescopic damper of FIG. 13 with a rebound spring disposed within the upper chamber of the internal rebound cylinder, according to embodiments of the present invention.

FIGS. 14 and 15 illustrate embodiments according to the second example in which the upper chamber 143 is an active chamber, and the lower chamber 144 is a dead chamber. In FIGS. 14 and 15 and elsewhere in this disclosure, embodiments in which only one chamber is active are illustrated with the upper chamber 143 shown as being the active chamber. However, that is a straightforward design choice, and the lower chamber can function as the active chamber without effecting the scope of the embodiments.

In embodiments of the second example, the rebound spring 105 is provided within the internal rebound cylinder 140. If only one chamber is active, then the rebound spring 105 is provided within the active chamber, e.g., upper chamber 143 as shown in FIGS. 14 and 15.

A design in which only one chamber is active is illustrated in FIG. 15. A fluid channel 152 enters the damper rod (piston rod) 115 and has a lower aperture 158 in fluid communication with the upper (active) chamber 143. In embodiments, the upper (active) chamber 143 of the internal rebound cylinder 140 is in fluid communication with an external hydraulic system (not shown) via fluid channel 152 and hydraulic line 178, such that the pressure in the upper chamber 143 is controllable by the external hydraulic system.

Figure 16:
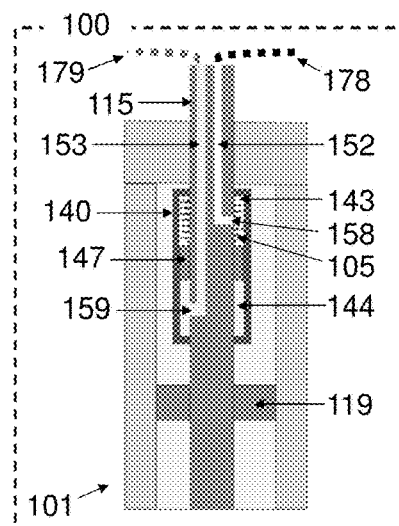
FIG. 16 is a partial schematic elevation-view drawing of a telescopic damper comprising an internal rebound cylinder, showing fluid channels in communication with the active and dead chambers of the internal cylinder, according to embodiments of the present invention.

A design in which both chambers are active is illustrated in FIG. 16. A first fluid channel 152 enters the damper rod (piston rod) 115 and has a lower aperture 158 in fluid communication with the upper chamber 143. A second fluid channel 153 enters the damper rod (piston rod) 115 and has a lower aperture 159 in fluid communication with the lower chamber 144. In embodiments, the upper active chamber 143 of the internal rebound cylinder 140 is in fluid communication with a first external hydraulic system (not shown) via fluid channel 152 and first hydraulic line 178, and the lower active chamber 144 of the internal rebound cylinder 140 is in fluid communication with a second external hydraulic system (not shown) via fluid channel 153 and second hydraulic line 179. In this design, the respective pressures in both chambers 143, 144 is controllable by the respective external hydraulic systems.

Figure 17A:
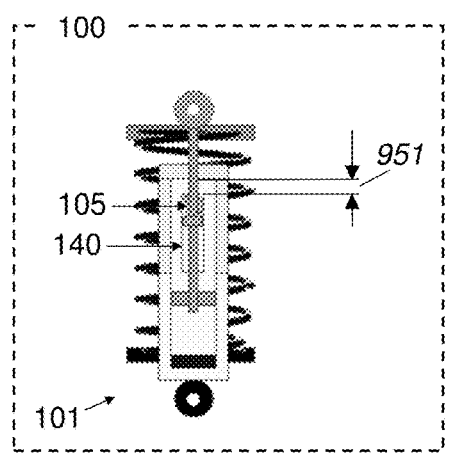
FIGS. 17A-C are schematic elevation-view drawings of a telescopic damper comprising an internal rebound cylinder, showing a rebound spring disposed within the internal cylinder, in design, zero-gap and knelt positions respectively, according to embodiments of the present invention.
Figure 17B:
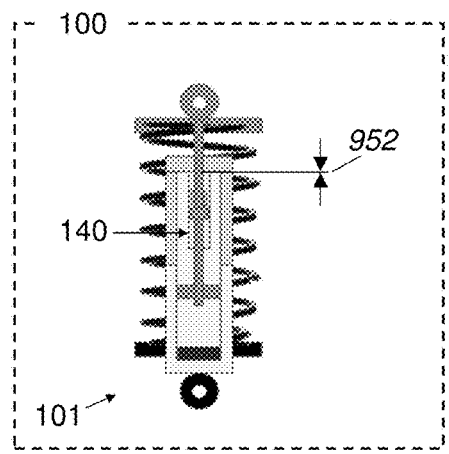
Figure 17C:
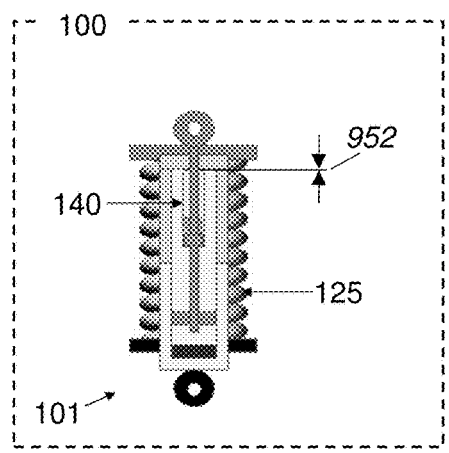

FIGS. 17A, 17B and 17C illustrate operation of the suspension system 100 of FIG. 11A in a kneeling mode that corresponds to Step S01 of FIG. 9. An internal rebound cylinder 140 is provided in a telescopic damper 101. The rebound spring 105 is located in an active chamber—upper chamber 143 of the internal rebound cylinder. According to embodiments, the internal rebound cylinder 140 has a single-acting cylinder design, and the upper chamber 143 is in fluid communication with an external hydraulic system (not shown) through the fluid channel 152 in damper rod 115. At a design ride height illustrated schematically in FIG. 17A, the top of the internal rebound cylinder is displaced below the top of the inside of the damper body 110, e.g., below a rebound striker 112, by a gap having a gap-length 951. By increasing hydraulic pressure in the active upper chamber 143, the internal rebound cylinder is driven upwards to close the gap to a zero gap-length 952, as shown in FIG. 17B. The pressure applied by the hydraulic system continues to drive the internal rebound cylinder 140 up the damper rod 115 to compress the telescopic damper 101 and the ride spring assembly 125 as well, as shown in FIG. 17C.

The result is that knee point of the wheel rate of the suspension system 100 can be driven into the bump region of the graph, as illustrated in FIG. 18, to provide an independent kneeling function, i.e., one which does not require the kneeling system to bear a load when not activated, and which, upon a failure or when not activated, allows a vehicle to travel in another mode that does not include kneeling. In this operating mode, the rebound spring 105 is not necessarily engaged at any point.

In other embodiments (not illustrated), negative pressure can cause a similar effect—the lower chamber 144 of the internal rebound system acts as the active chamber and is in fluid communication with an external hydraulic system through the fluid channel 152 in damper rod 115. By decreasing hydraulic pressure in the lower chamber 144, the internal rebound cylinder is driven upwards to close the gap to a zero gap.

Referring now to FIGS. 19A and 19B, operation of the suspension system 100 is illustrated in an operating mode that corresponds to Step S02 of FIG. 9.

FIG. 19A shows a suspension system 100 according to the second example, similar to the suspension system 100 of FIG. 17A, comprising an internal rebound cylinder 140 and a single fluid channel 152 placing the upper active chamber 143 of the internal rebound cylinder 140 in fluid communication with an external hydraulic system. At a design ride height illustrated schematically in FIG. 19A, the top of the internal rebound cylinder is displaced below the top of the inside of the damper body 110, e.g., below a rebound striker 112, by a gap having a gap-length 961.

As hydraulic pressure is increased in the upper active chamber 143 by the external hydraulic system, the internal rebound cylinder 140 is forced upwards, closing the gap above the internal rebound cylinder 140 to a gap-length 962. At the same time, the rebound spring 105 in the internal rebound cylinder 140 is distanced from the top of the inside of the internal rebound cylinder 140 so as to push the effect of the rebound spring 105 earlier in the rebound stroke of the damper 101. This has the effect of moving the knee point of the wheel rate curve of the suspension system 100 to the right, similar to the change in knee point that is shown in FIG. 10B. Reducing the hydraulic pressure in the active upper chamber 143 of the internal rebound cylinder 140 has the opposite effect, i.e., it moves the knee point to the left, similar to what is shown in FIG. 10C.

The regulation of pressure in the internal rebound cylinder 140 in a non-kneeling driving mode does not affect the position of the damper rod 115 or of the piston (piston valve 119) relative to the damper body 110. Relative movement of the internal hydraulic cylinder 140 is within the upper chamber 103 of the damper 101; the fluid in the upper chamber 103 flows freely around the internal rebound cylinder 140 and there is no change in volume or pressure that would cause a relative movement of the damper rod 115 or piston valve 119.

Third Example of a Force-Transfer System

A third, non-limiting example of a suspension system 100 comprising a force-transfer system 180 (as shown in the block diagram of FIG. 5) is illustrated schematically in FIGS. 20, 21, 22, 23, 24A and 24B.

Figure 20:
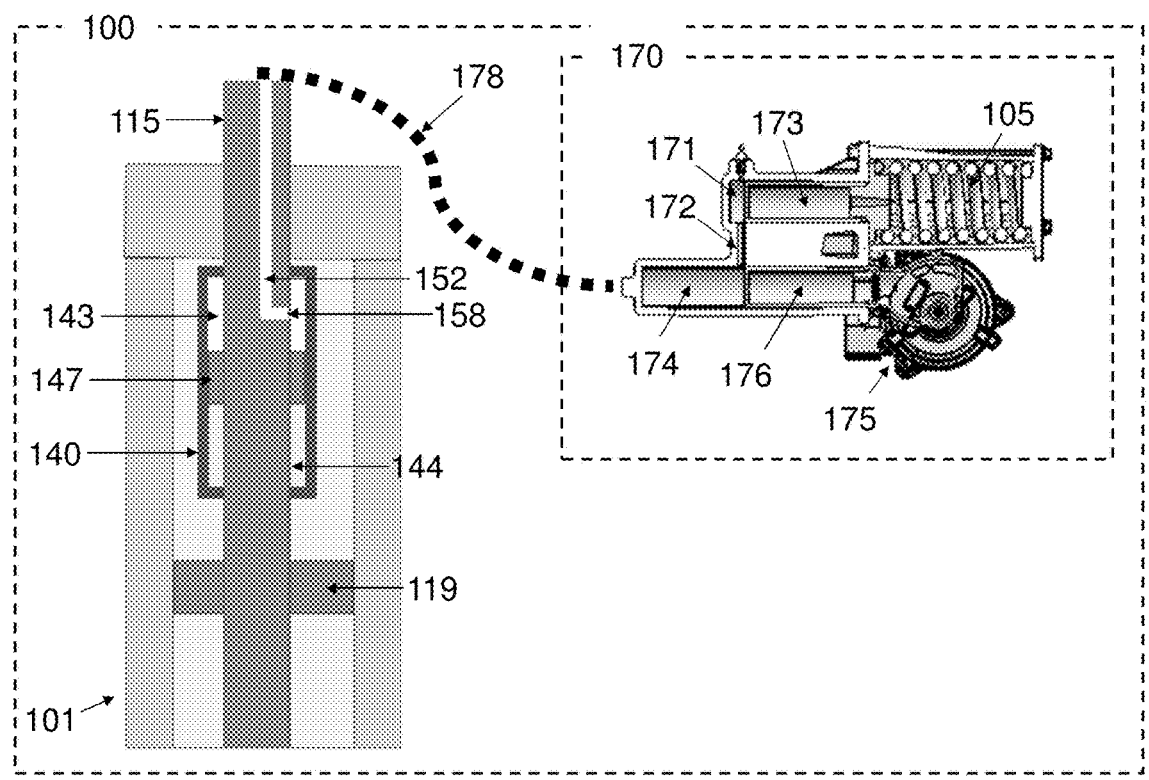
FIG. 20 is a schematic illustration of a suspension system, wherein a hydraulic system is in fluid communication with the active chamber of an internal rebound cylinder disposed within a telescopic damper, according to embodiments of the present invention.

The force-transfer system 180 of the second example includes an external hydraulic system 170, as shown schematically, e.g., in FIG. 20.

According to the third example, a rebound spring 105 is located not within the damper 101 as is the case in the first example, or in the internal rebound cylinder 140 as is the case in the second example, but within a hydraulic system 170 provided for regulating hydraulic pressure within one or more chambers of the internal rebound cylinder 140.

A schematic detail of a telescopic damper 101 is shown in FIG. 20, connected by hydraulic line 178 to a hydraulic system 170. FIG. 20 illustrates a non-limiting example of a hydraulic system 170 in which a rebound spring 105 is compressible by pressure in an 'external' rebound cylinder 171 transmitted via a rebound-cylinder piston 173. The phrase 'external rebound cylinder' is used herein to indicate a rebound cylinder that is external to the damper 101, to distinguish the rebound cylinder 171 of the hydraulic system 170 from the similarly-named internal rebound cylinder 140.

Figure 21:
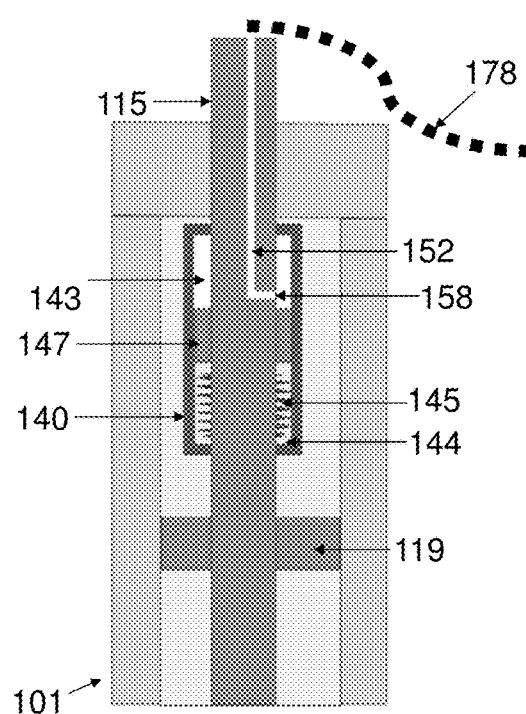
FIG. 21 shows the telescopic damper of FIG. 20 with a return spring disposed in a dead chamber of the internal rebound cylinder, according to embodiments of the present invention.

An internal rebound cylinder 140, e.g., a single-acting hydraulic cylinder, is provided within the telescopic damper 101. The rebound piston 147 (a type of rebound stop, fixed to the damper rod 115) defines and separates between an upper chamber 143 and a lower chamber 144 within the internal rebound cylinder 140. In the example, of FIGS. 20 and 21, only the upper chamber 143 is an active chamber. In some embodiments, as shown in FIG. 21 (in which the hydraulic system 170 is not shown), a return spring 145 is provided in the dead chamber (lower chamber 144), which, inter alia, urges the rebound piston 147 to a 'home position' when hydraulic pressure in the upper active chamber 143 falls.

As was described elsewhere, e.g., with respect to FIG. 15, the hydraulic system 170 is in fluid communication with the active upper chamber 143 of the internal rebound cylinder 140 through a fluid channel 152 running longitudinally through the damper rod 115 and a lower aperture 158 of the fluid channel 152. Within the hydraulic system, a hydraulic fluid reservoir 174 is in fluid communication with the damper 101 via the hydraulic line 178 and with a rebound cylinder 171 via a rebound spring port 172. During the rebound stroke of the damper 101, when the internal rebound cylinder 140 contacts the rebound striker 112, the active chamber 143 is compressed. Fluid is then transferred via the hydraulic line 178 to the hydraulic system 170, where a reacting pressure is regulated by displacing the rebound cylinder piston 173, which in turn is arranged to compress the rebound spring 105. This pressure generated ultimately reacts further extension of the damper 101, therefore increasing the wheel rate stiffness, e.g., as illustrated in FIG. 10A below knee point 1101. When hydraulic pressure in the rebound cylinder 171 falls, the rebound spring 105 is effective to return to its uncompressed length, displacing fluid out of the hydraulic system 170 and into the active chamber 143 of the internal rebound cylinder 140, therefore extending the damper 101 to a length above a knee point, e.g., 1101 of FIG. 10A.

Figure 22:
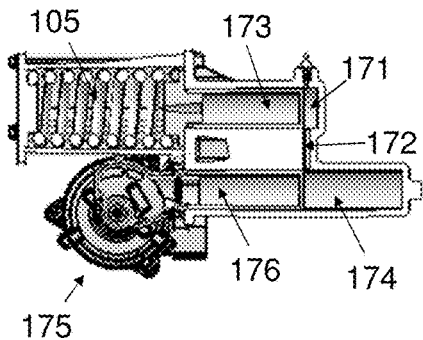
FIGS. 22-24 are schematic cutaway illustrations of a wheel assembly comprising a suspension system and a hydraulic system, according to embodiments of the present invention.
Figure 22:
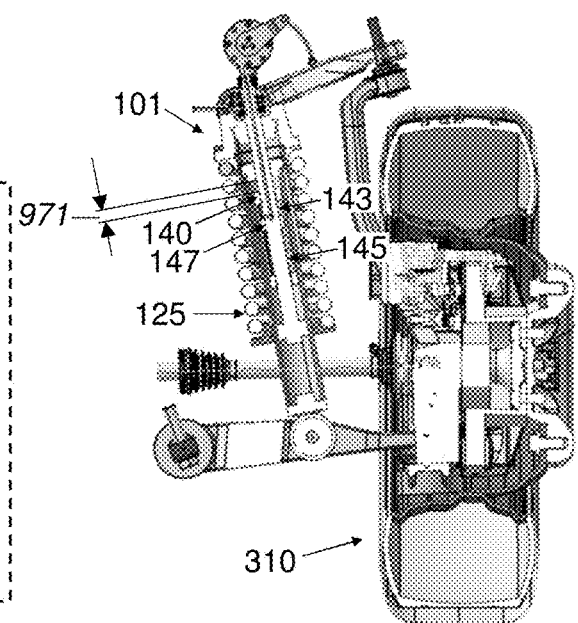

FIG. 22 shows components of a wheel assembly 150 including a telescopic damper 101 according to the third example. A wheel with tire 310 is shown for purposes of illustration. The damper 101 is shown in a state emulating design ride height, and the hydraulic system 170 is in an operational state similar to that of FIG. 20, with the rebound spring 105 not engaged. A 'kneeling piston' 176 is also not engaged, thus leaving the reservoir 174 in fluid communication with the 'external' rebound cylinder 171 via the rebound spring port 172.

Figure 23:
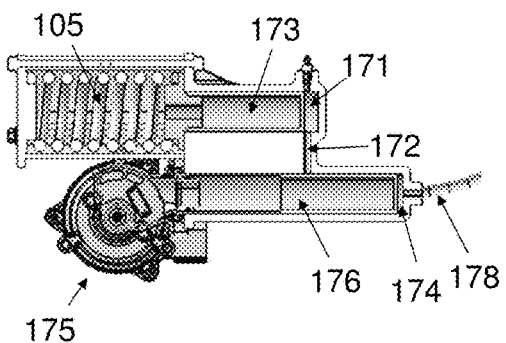
Figure 23:
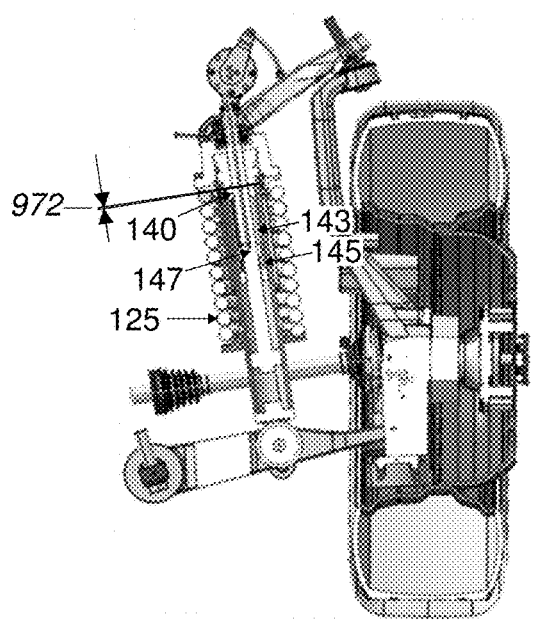

The internal rebound cylinder 140 is shown disposed within the damper 101 with a gap of gap-length 971, separating the top of the internal rebound cylinder 140 from the upper limit of the interior volume of the damper 101. The gap-length 971 corresponds to a predetermined or desired point in the rebound stroke of the damper 101 at which the controllable rebound function, e.g., of a rebound spring, engages, for example of 10-20 mm vertical travel into the rebound stroke, or 10-30 mm, or 10-40 mm, or 10-50 mm, or 20-30 mm, or 20-40 mm, or 20-50 mm, or 30-40 mm, or 30-50 mm, or 40-50 mm (all ranges inclusive), or less than 20 mm or greater than 50 mm FIG. 23 illustrates operation of the telescopic damper 101 of FIG. 22 in a kneeling mode that corresponds to Step S01 of FIG. 9. In the kneeling mode, the pump/motor 175 drives the kneeling piston 176 out to close the rebound spring port 172, which is shown as isolated in FIG. 23, such that the external rebound cylinder 171 is not in communication with the reservoir 174 during a kneeling operation. The kneeling piston 176 displaces hydraulic fluid, e.g., from the reservoir 174, into the active upper chamber 143 of the internal rebound cylinder 140 in the telescopic damper 101. Displaced fluid drives the internal rebound cylinder 140 into the rebound striker 112 (not shown in FIG. 23), as evidenced by the zero gap-length 972 shown in FIG. 23. The increased fluid quantity and pressure in the upper chamber drives down the rebound stop (rebound piston 147) to compress the return spring 145 in the dead chamber 144, closing the telescopic damper 101 to kneeling length. (The return spring 145 is not present in every implementation according to the third example.) The hydraulic pressure shortening the damper 101 for kneeling a vehicle 10 can be effective to compress the ride spring 125 to a targeted compressed length. In the non-limiting example of FIG. 23, the body drop to kneeling height is 70 mm, corresponding to a 35 mm stroke of the damper 101 (leveraged by an exemplary motion ratio of the suspension system).

Figure 24:
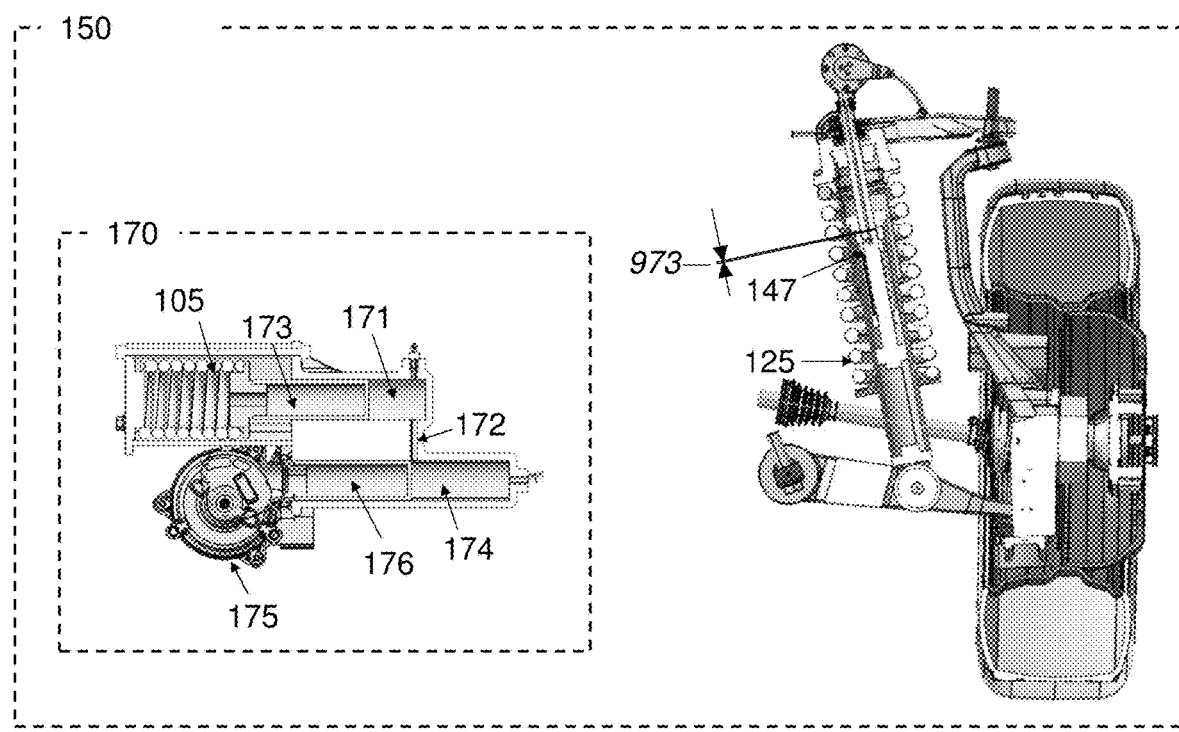

Referring now to FIG. 24, operation of the suspension system 100 is illustrated in an operating mode that corresponds to Step S02 of FIG. 9. During the rebound stroke of the damper 101, the gap between the top of the internal rebound cylinder 140 and the top of the damper 101, e.g., at a rebound striker 112 (not shown in FIG. 24), is eliminated by the lengthening of the damper 101. The consumed gap is indicated as zero-gap length 973. In embodiments, the point in the rebound stroke at which the gap is closed out is preset by setting the initial gap, e.g., at design gap-length 971 shown in FIG. 22. FIG. 24 illustrates the operation of the suspension system 100 after the engagement point is passed, e.g., at 90 mm of rebound travel.

Once the rebound stroke causes the gap to be consumed, then hydraulic fluid is displaced from the internal rebound cylinder 140 to the fluid reservoir 174 of the hydraulic system 170 via the fluid channel 152 in the damper rod 115 and the hydraulic line 178. The pressurized fluid produces a 'rebound' force within the telescopic damper 101, e.g., between the damper rod 115 and damper body 110, dependent on extension displacement, that acts like an extension spring. In the hydraulic system, the displaced fluid gains pressure, e.g., in the reservoir 174, and the rebound cylinder 171 via the rebound spring port 172, exerting additional pressure on the rebound-cylinder piston 173 so as to compress the rebound spring 105, that is used to regulate the pressure.

FIG. 24 shows that the aperture 158 can be 'blocked,' e.g., by part of the internal rebound cylinder 140 itself, when the gap 973 above the internal rebound cylinder 140 is closed if the design does not take this into account. According to some embodiments, a 'pocket' comprising two apertures is provided in the rebound piston 147. Before the maximum rebound wheel travel limit is met, this additional upper aperture is progressively closed cylinder. Subsequently, during the remaining rebound travel, e.g., the last 5 mm or 10 mm of rebound travel, fluid transmission is instead forced though just the one lower (and smaller-diameter) aperture that sits within the 'pocket' in the rebound piston 147. In some embodiments, this additional pocket/aperture feature can be used to provide further damping in this region, that ultimately slows the final extension velocity, cushioning the rebound stop.

Figure 25:
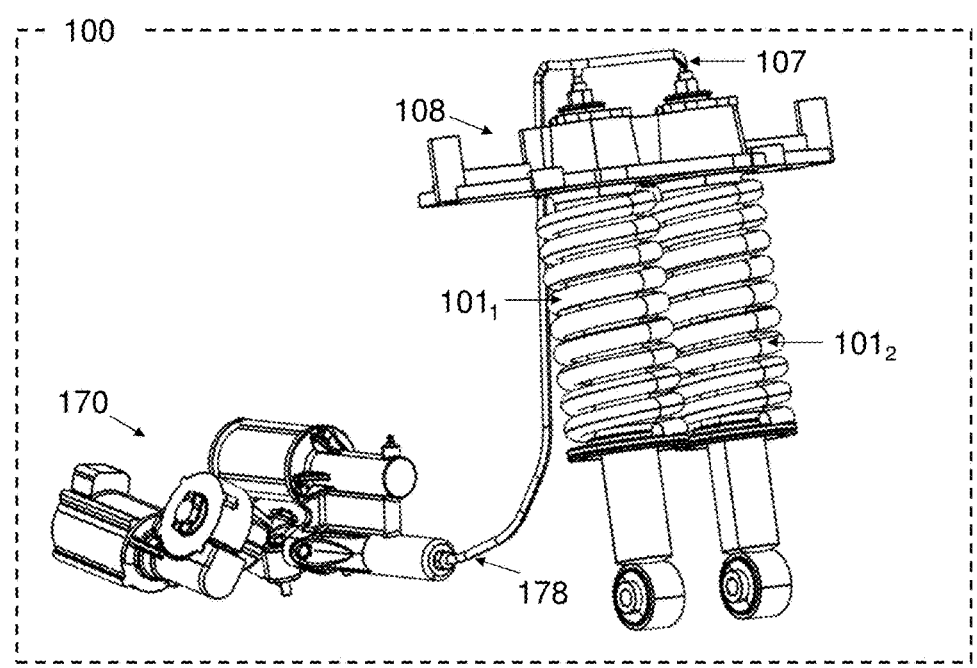
FIGS. 25 and 26 are schematic illustrations of a suspension system comprising a yoked pair of twin dampers, and a wheel assembly comprising such a suspension system, respectively, according to embodiments of the present invention.
Figure 26:
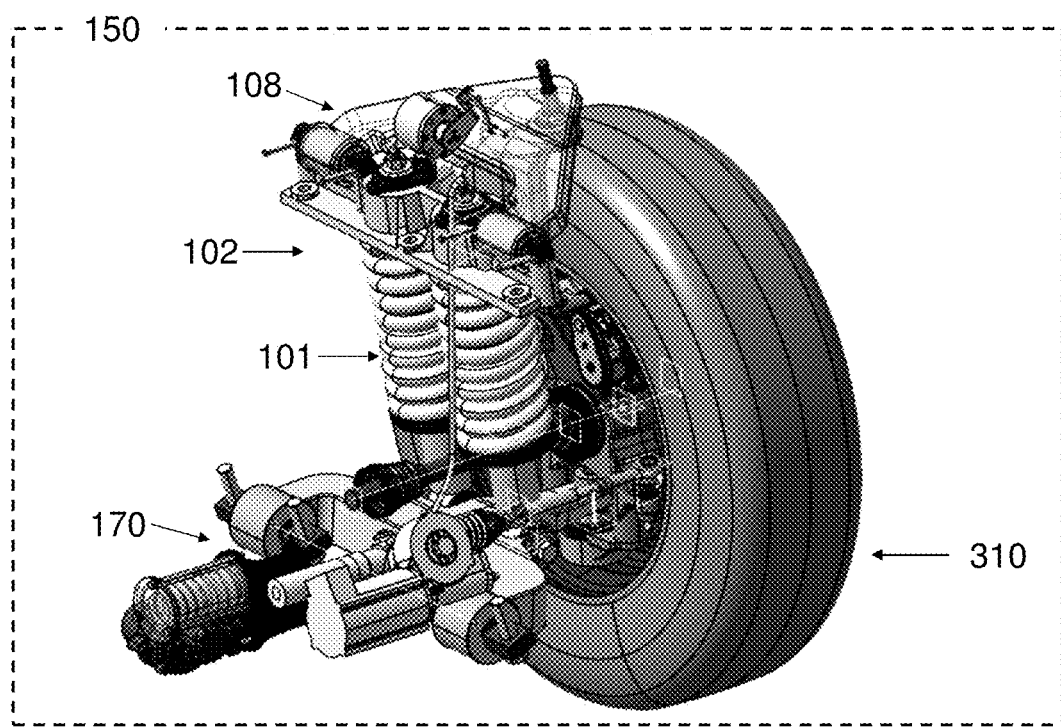

We now refer to FIGS. 25 and 26, which illustrate the use of twin dampers $101_1$, $101_2$ in a suspension system 100. According to embodiments, the force-transfer system 180 of FIG. 5 comprises exactly one hydraulic system 170 including a single external rebound cylinder 171, wherein a single rebound spring is arranged within the exactly one hydraulic system 170 to be compressible by pressure in the external rebound cylinder 171 acting upon the rebound-cylinder piston 173, and the exactly one hydraulic system 170 is in fluid communication, in parallel, with the respective internal rebound cylinders 140 of the twin dampers 100.

The use of twin dampers is applicable to and combinable with any of the embodiments disclosed herein of suspension systems 100 and/or wheel assemblies 150, and to any of the foregoing three examples of force-transfer systems 180. Embodiments regarding deployment of a single hydraulic system 170 for paired dampers are applicable to the second and third examples of force-transfer mechanisms 180.

Use of twin telescopic dampers 101 in place of a single damper constitutes a design choice based, inter alia, on loads expected within the system, which depend on the weight, e.g., gross loaded weight, of a vehicle 10, taken together with cost and other straightforward engineering factors. In one non-limiting example, a designer is less likely to choose a twin-damper arrangement for a vehicle that weighs less than 5 tons, and more likely to choose a twin-damper arrangement for a vehicle that weighs more than 5 tons.

In some embodiments, two dampers 101, e.g., respective damper rods 115 and/or upper spring seats 124 of the two dampers 101, are yoked together by a yoke assembly 108. In some embodiments the upper spring seats 124 are replaced by the yoke assembly 108. A hydraulic piping arrangement 107 can include a manifold or other suitable arrangement of hydraulic pipes to place both dampers, i.e., respective internal rebound cylinders 140, in fluid communication with the hydraulic system 170. The hydraulic system 170 has features similar to those of hydraulic system 170 of FIGS. 20 and 22-24, except that the single, i.e., exactly one, hydraulic system 170, is effective to regulate operation in each of the operating modes—e.g., kneeling and driving without kneeling—in the two yoked dampers 101. An exemplary wheel assembly 150 according to embodiments is illustrated in FIG. 26, showing the installation of the twin dampers 101, yoke assembly 108, and exactly one hydraulic system 170.

Figures 27, 28:
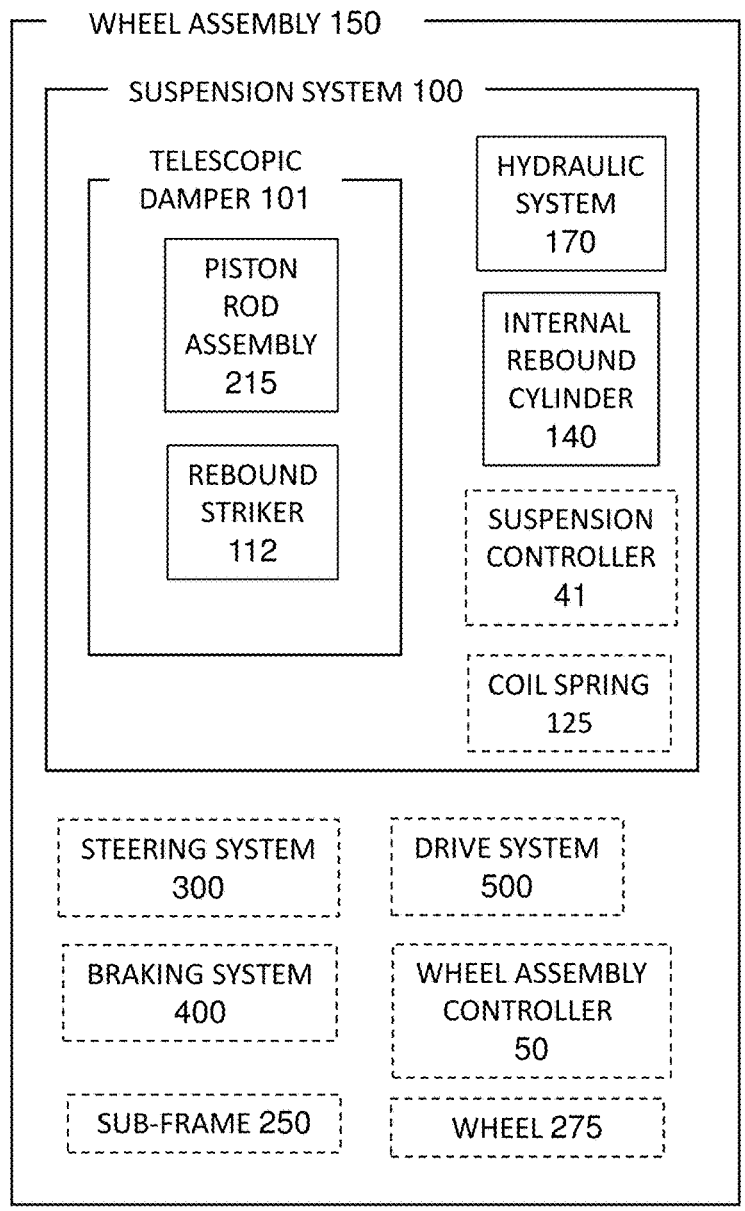

Reference is now made to FIGS. 27 and 28. According to embodiments, a wheel assembly 150, e.g., for a vehicle such as vehicle 10 of FIG. 6, includes a suspension system 100 and, optionally, additional subsystems such as one or more of: a steering system 300, a braking system 400, and a drive system 500. In some embodiments, the wheel assembly 150 includes a sub-frame 250 mountable to a vehicle platform 12 and/or a wheel 275. In some embodiments, the wheel assembly 150 includes a wheel assembly controller 50. In some designs, a wheel-assembly controller 50 performs some or all of the functions of a dedicated suspension controller 41 which may or may not be present (as a component of the suspension system 100) as well. In some designs, some of the control functionality with respect to the suspension system 100 can be shared and/or duplicated for redundancy purposes, with a dedicated suspension controller 41.

The suspension system 100 of FIG. 27 includes a telescopic damper 101 that comprises a rebound striker 112 and a piston rod assembly 215 that includes a piston rod (damper rod) 115 and rebound stop 117, e.g., rebound piston 147. An internal rebound cylinder 140 is disposed within the telescopic damper, and the rebound piston 147 defines respective upper and lower chambers 143, 144, at least one of which is an active chamber.

The suspension system 100 of FIG. 27 also includes a hydraulic system 170 arranged in fluid communication with an active chamber, e.g., upper chamber 143, of the internal rebound cylinder 140. According to embodiments, the hydraulic system 170 is controllable to regulate a pressure in the active chamber so as to change a position of the internal rebound cylinder 140 relative to the rebound striker 112 and thereby kneel the vehicle 10 at the wheel assembly 150. Equivalently, the hydraulic system 170 can be controllable to regulate a change a position of the internal rebound cylinder 140 relative to the rebound striker 112, e.g., by controlling the pressure in the active chamber, so as to and thereby kneel the vehicle 10 at the wheel assembly 150.

Non-limiting examples of suspension systems 100 according to the disclosure of FIG. 27 are (1) the suspension system 100 of FIGS. 15, 16 and 17C, which includes a rebound spring 105 in the internal rebound cylinder 140 and is effective to control the hydraulic system 170 to change a position of the internal rebound cylinder 140 relative to the rebound striker 112 and kneel the vehicle 10 at the wheel assembly 150, and (2) the suspension system 100 of FIGS. 20, 21, 22, and 23, which includes a rebound spring 105 in the hydraulic system 170 and is effective to control the hydraulic system 170 to change a position of the internal rebound cylinder 140 relative to the rebound striker 112 and kneel the vehicle 10 at the wheel assembly 150.

Referring now to FIG. 28, a method is disclosed for operating a vehicle 10, e.g., the vehicle 10 of FIG. 6, comprising a vehicle platform 12 that includes a plurality of wheel assemblies 150 according to FIG. 27. In some embodiments, the method is carried out by a suspension controller 41 and/or by a wheel-assembly controller 50. As illustrated by the flow chart in FIG. 28, the method comprises the method step S11:

Step S01: kneeling the vehicle 10 at a respective wheel assembly 150 by regulating a pressure in the active chamber 143 of the internal rebound cylinder 140 so as to change a position of the internal rebound cylinder 140 relative to the rebound striker 112 and kneel the vehicle 10 at the wheel assembly 150. In some embodiments, changing the hydraulic pressure in the active chamber 143 includes increasing the hydraulic pressure in the active chamber 143.

In some embodiments, one or more suspension controllers 41 and/or one or more wheel-assembly controllers 50 and/or a vehicle controller 15 coordinate the control of multiple hydraulic systems 170, to kneel the vehicle 10 at multiple wheel assemblies 150.

Figures 29, 30:
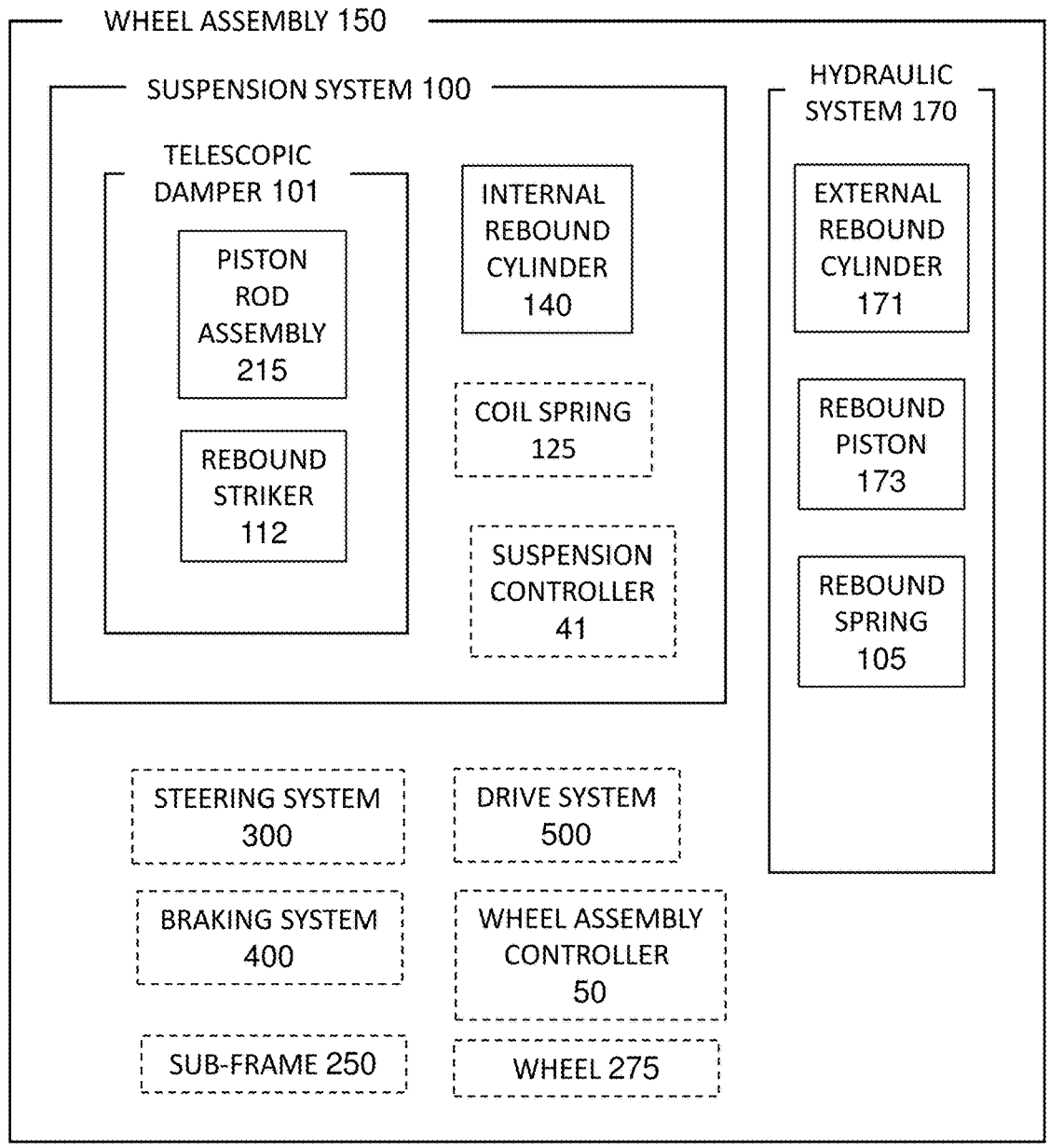

Reference is now made to FIGS. 29, 30 and 31. According to embodiments, a wheel assembly 150, e.g., for a vehicle such as vehicle 10 of FIG. 6, includes a suspension system 100 and, optionally, additional subsystems such as one or more of: a steering system 300, a braking system 400, and a drive system 500. In some embodiments, the wheel assembly 150 includes a sub-frame 250 mountable to a vehicle platform 12 and/or a wheel 275. In some embodiments, the wheel assembly 150 includes a wheel assembly controller 50. In some designs, a wheel-assembly controller 50 performs some or all of the functions of a dedicated suspension controller 41 which may or may not be present (as a component of the suspension system 100) as well. In some designs, some of the control functionality with respect to the suspension system 100 can be shared and/or duplicated for redundancy purposes, with a dedicated suspension controller 41.

The suspension system 100 of FIG. 29 includes a telescopic damper 101 configured to mediate between an unsprung portion and a sprung portion of the wheel assembly, comprising a rebound striker 112 and a piston rod assembly 215 that includes a piston rod (damper rod) 115 and rebound stop 117, e.g., rebound piston 147. An internal rebound cylinder 140 is disposed within the telescopic damper, and the rebound piston 147 defines respective upper and lower chambers 143, 144, at least one of which is an active chamber.

The suspension system 100 of FIG. 29 also includes a hydraulic system 170 arranged in fluid communication with an active chamber, e.g., upper chamber 143, of the internal rebound cylinder 140. According to embodiments, the hydraulic system 170 is controllable to regulate a pressure in the active chamber 143 so as to change a position of the internal rebound cylinder 140 relative to the rebound striker 112 and, in a first operating mode, to regulate a wheel rate of the wheel assembly 150. In embodiments, the hydraulic system includes an external rebound cylinder 171, a rebound piston 173, and a rebound spring 105 arranged to be compressible by the rebound piston. The suspension system 100 of FIG. 29 is effective, in a first operating mode, to regulate a wheel rate of the wheel assembly 150.

A non-limiting example of a suspension system 100 according to the disclosure of FIG. 29 is the suspension system 100 of FIGS. 20, 21, 22, and 24, which includes a rebound spring 105 in the hydraulic system 170 and is effective to control the hydraulic system 170 to change a position of the internal rebound cylinder 140 relative to the rebound striker 112 and kneel the vehicle 10 at the wheel assembly 150. In embodiments, the hydraulic system 170 is controllable to change a wheel-travel value at which the wheel rate of the wheel assembly 150 increases (or decreases, depending on perspective, i.e., the hydraulic system 170 is controllable to change the knee point).

In some embodiments, the suspension system 100 of FIG. 29 is effective, in a second operating mode, e.g., a stationary kneeling mode, to kneel the vehicle 10 at the wheel assembly 150, as illustrated in FIG. 23. The kneeling includes controlling the hydraulic system 170 to regulate a hydraulic pressure in the active chamber 143 of the internal rebound cylinder 140 to shorten the length of the telescopic damper 101.

The suspension system 100 of FIG. 29, and by extension, of FIGS. 20-24, has the capability to control the position of maximum rebound wheel travel by modifying a rebound limit of the telescopic damper, to regulate a maximum steering angle of the steering system, and thereby control maximum steer angles. For selected slow speed maneuvering events, greater steering angles can be allowed during a limited vertical suspension travel range. Maximum steering angles (and therefore minimum turning circles) are often constrained by package (and working angles of joints) limitations that are encountered at maximum bump and rebound wheel travels, and specifically, the tire clearance to suspension strut can be the constraint that determines the maximum steering angle. By preventing full rebound travel in this mode, (e.g., by 15 mm), more clearance between the wheel and strut is available for the option of additional steering rack travel, which in this example achieves an extra 1 degree of road wheel steer angle. This results in the theoretical curb-to curb-turning circle diameter being reduced by 300 mm Referring now to FIG. 30, a first method is disclosed for operating a vehicle 10, e.g., the vehicle 10 of FIG. 6, comprising a vehicle platform 12 that includes a plurality of wheel assemblies 150 according to FIG. 29. In some embodiments, the method is carried out by a suspension controller 41 and/or by a wheel-assembly controller 50. As illustrated by the flow chart in FIG. 30, the method comprises the method step S21:

Step S21 modifying a wheel-travel value at which the wheel rate of a respective wheel assembly 150 changes, by controlling a hydraulic system 170 to regulate the hydraulic pressure in the active chamber 143 of the internal rebound cylinder 140.

Referring now to FIG. 31, a second method is disclosed for operating a vehicle 10, e.g., the vehicle 10 of FIG. 6, comprising a vehicle platform 12 that includes a plurality of wheel assemblies 150 according to FIG. 29. In some embodiments, the method is carried out by a suspension controller 41 and/or by a wheel-assembly controller 50. As illustrated by the flow chart in FIG. 31, the second method comprises the method steps S21 and S22:

Step S21: modifying a wheel-travel value at which the wheel rate of a respective wheel assembly 150 changes, by controlling a hydraulic system 170 to regulate the hydraulic pressure in the active chamber 143 of the internal rebound cylinder 140.

Step S22: kneeling the vehicle 10 at a respective wheel assembly 150 by changing a hydraulic pressure in the active chamber 143 of an internal rebound cylinder 140 to apply a force that shortens the telescopic damper 101

Step S21 of the method is carried out at a first time, and Step S22 is carried out at a second time, i.e., a different time that Step S21, which can be later or earlier. Each of the two steps relates to a different operating mode of the suspension system 100 or of the vehicle 10, and they cannot be carried out simultaneously.

Reference is now made to FIGS. 32A and 32B. According to embodiments, a wheel assembly 150, e.g., for a vehicle such as vehicle 10 of FIG. 6, includes a suspension system 100 and, optionally, additional subsystems such as one or more of:

a steering system 300, a braking system 400, and a drive system 500. In some embodiments, the wheel assembly 150 includes a sub-frame 250 mountable to a vehicle platform 12 and/or a wheel 275. In some embodiments, the wheel assembly 150 includes a wheel assembly controller 50. In some designs, a wheel-assembly controller 50 performs some or all of the functions of a dedicated suspension controller 41 which may or may not be present (as a component of the suspension system 100) as well. In some designs, some of the control functionality with respect to the suspension system 100 can be shared and/or duplicated for redundancy purposes, with a dedicated suspension controller 41.

The suspension system 100 of FIG. 32A includes a telescopic damper 101 configured to mediate between an unsprung portion and a sprung portion of the wheel assembly, a ride spring 125, and an internal rebound cylinder 140 disposed within the telescopic damper 101. An active chamber 143 of the internal rebound cylinder 140 is arranged in fluid communication with a hydraulic system 170, e.g., the hydraulic system 170 of FIG. 32B, which is configured to control a hydraulic pressure in the active chamber 143 of the internal rebound cylinder 140. The hydraulic system 170 of FIG. 32B includes a rebound cylinder 171 and a rebound spring 105 arranged within the hydraulic system 170 to be compressible by pressure in the rebound cylinder 171.

In some embodiments, controlling the hydraulic pressure is effective in a first mode of vehicle operation to kneel the vehicle 10 at the wheel assembly 150 and in a second mode of vehicle operation to regulate a wheel rate of the wheel assembly 150. In some embodiments, the hydraulic system 170 is controllable to change a wheel-travel value at which the wheel rate of the wheel assembly 150 changes in the second mode of vehicle operation.

Figure 33:
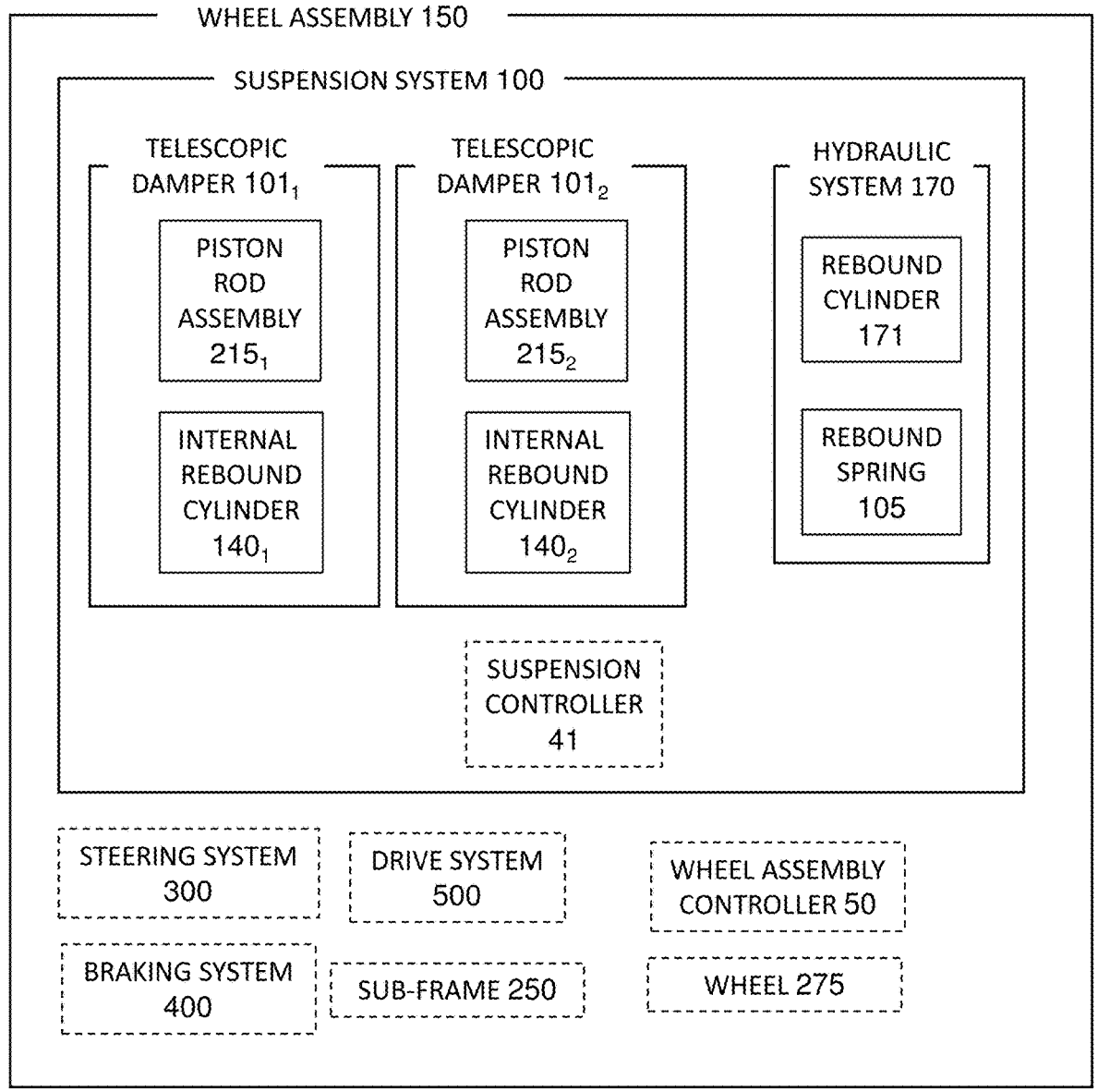

Reference is now made to FIG. 33. According to embodiments, a suspension system 100 for a wheel assembly 150 of a vehicle such as, for example, vehicle 10 of FIG. 6, includes a yoked pair of telescopic dampers $101_1$, $101_2$. Each telescopic damper $101_1$, $101_2$ includes piston rod assembly 215 including a rebound stop, e.g., rebound piston 147, and an internal rebound cylinder 140 disposed within the telescopic damper 101, the internal rebound cylinder 140 encompassing the rebound stop/piston 147. The wheel assembly can optionally include additional subsystems such as one or more of: a steering system 300, a braking system 400, and a drive system 500. In some embodiments, the wheel assembly 150 includes a sub-frame 250 mountable to a vehicle platform 12 and/or a wheel 275. In some embodiments, the wheel assembly 150 includes a wheel assembly controller 50. In some designs, a wheel-assembly controller 50 performs some or all of the functions of a dedicated suspension controller 41 which may or may not be present (as a component of the suspension system 100) as well. In some designs, some of the control functionality with respect to the suspension system 100 can be shared and/or duplicated for redundancy purposes, with a dedicated suspension controller 41.

The suspension system 100 of FIG. 33 also includes a hydraulic system 170 that comprises a rebound cylinder 171, and a rebound spring 105 arranged within the hydraulic system 170 to be compressible by pressure in the rebound cylinder 171. The hydraulic system 170 is arranged to be in parallel fluid communication with, and controllable to regulate a pressure in, an active chamber 143 of each respective internal rebound cylinder 140.

The suspension system 100 of FIG. 33 is effective, in a first mode of vehicle operation, to kneel the vehicle 10 at the wheel assembly 150 and, in a second mode of vehicle operation, to regulate a wheel rate of the wheel assembly 150. In embodiments, the hydraulic system 170 is controllable to change a wheel-travel value at which the wheel rate of the wheel assembly 150 changes (i.e., the 'knee point' of the wheel rate curve) in the second mode of vehicle operation.

A non-limiting example of a suspension system 100 according to the disclosure of FIG. 33 is the suspension system 100 of FIG. 25, which includes a yoked pair of telescopic dampers $101_1$, $101_2$ wherein respective damper rods 115 and/or upper spring seats 124 of the two dampers 101 are yoked together by a yoke assembly 108. In some embodiments the upper spring seats 124 are replaced by the yoke assembly 108. A hydraulic piping arrangement 107 can include a manifold or other suitable arrangement of hydraulic pipes to place both dampers, i.e., respective internal rebound cylinders 140, in fluid communication with the hydraulic system 170. The hydraulic system 170 has features similar to those of hydraulic system 170 of FIGS. 20 and 22-24, except that the single, i.e., exactly one, hydraulic system 170, is effective to regulate operation in each of the operating modes—e.g., kneeling and driving without kneeling—in the two yoked dampers 101.

Reference is now made to FIG. 34. According to embodiments, a kneeling system 90 for a wheel assembly 150 comprises a telescopic damper 101 configured to mediate between an unsprung portion and a sprung portion of the wheel assembly 150. The telescopic damper 101 comprises a rebound striker 112 and a piston rod assembly 215 including a rebound stop such as a rebound piston 147. The kneeling system also comprises an internal rebound cylinder 140 disposed within the telescopic damper 101. The internal rebound cylinder 140 encompasses the rebound piston 147, which defines respective upper and lower chambers 143, 144 of the internal rebound cylinder 140. An active, e.g., upper chamber 143 of the internal rebound cylinder 140 is arranged in fluid communication with a hydraulic system 170 controllable to regulate the pressure in the active chamber 143 so as to change a position of the internal rebound cylinder 140 relative to the rebound striker 112 and kneel the vehicle 10. When the hydraulic system 170 is not energized, e.g., in case of a hydraulic system failure, the kneeling system 90 is effective to operate in a driving mode of operation, e.g., at a design ride height, so as to allow vehicle travel without kneeling.

In some embodiments, the kneeling system 90 additionally comprises a ride spring 125 at least partly surrounding the telescopic damper 101. The ride spring 125 has a rest length and a fully-compressed length, and kneeling the vehicle 10 at the respective wheel assembly 150 of the vehicle 10 includes compressing the ride spring 125 to its fully-compressed length. In some embodiments, the ride spring 125 is not completely compressed to its fully-compressed length at kneeling height.

Non-limiting examples of kneeling systems 90 according to the disclosure of FIG. 34 are the suspension systems 100 of FIGS. 15, 16 and 17C, and of FIGS. 20, 21, 22, and 23, all of which are effective to control the hydraulic system 170 to change a position of the internal rebound cylinder 140 relative to the rebound striker 112 and kneel the vehicle 10 at the wheel assembly 150.

Reference is now made to FIGS. 35A, 35B, and 35C. According to embodiments, a wheel assembly 150, e.g., for a vehicle such as vehicle 10 of FIG. 6, includes a suspension system 100. In some embodiments, the wheel assembly 150 includes a wheel assembly controller 50. In some designs, a wheel-assembly controller 50 performs some or all of the functions of a dedicated suspension controller 41 which may or may not be present (as a component of the suspension system 100) as well. In some designs, some of the control functionality with respect to the suspension system 100 can be shared and/or duplicated for redundancy purposes, with a dedicated suspension controller 41.

The suspension system 100 of FIG. 35A includes a telescopic damper 101 configured to mediate between an unsprung portion and a sprung portion of the wheel assembly, and an internal rebound cylinder 140 disposed within the telescopic damper 101. An active chamber 143 of the internal rebound cylinder 140 is arranged in fluid communication with a hydraulic system 170, e.g., the hydraulic system 170 of FIG. 27, or, alternatively, the hydraulic system 170 of FIG. 35B, either of which is configured to control a hydraulic pressure in the active chamber 143 of the internal rebound cylinder 140. In embodiments, the hydraulic system 170 of FIG. 35B includes a rebound cylinder 171 and a rebound spring 105 arranged within the hydraulic system 170 to be compressible by pressure in the rebound cylinder 171.

A first non-limiting example of suspension systems 100 according to the disclosure of FIG. 35A is the suspension system 100 of FIGS. 15, 16 and 17C, which includes a rebound spring 105 in the internal rebound cylinder 140 and is effective to control the hydraulic system 170 to change a position of the internal rebound cylinder 140 relative to the rebound striker 112 and kneel the vehicle 10 at the wheel assembly 150. A second non-limiting example of suspension systems 100 according to the disclosure of FIG. 35A is the suspension system 100 of FIGS. 20, 21, 22, and 23, which includes a rebound spring 105 in the hydraulic system 170 and is effective to control the hydraulic system 170 to change a position of the internal rebound cylinder 140 relative to the rebound striker 112 and kneel the vehicle 10 at the wheel assembly 150.

In some embodiments, as illustrated in the block diagram of FIG. 35C, the suspension system 100 includes the hydraulic system 170, which includes a rebound cylinder 171 and a rebound spring 105 arranged within the hydraulic system 170 to be compressible by pressure in the rebound cylinder 171.

A non-limiting example of a suspension system 100 according to the disclosure of FIG. 35C is the suspension system 100 of FIGS. 20, 21, 22, and 24, which includes a rebound spring 105 in the hydraulic system 170 and is effective to control the hydraulic system 170 to change a position of the internal rebound cylinder 140 relative to the rebound striker 112 and kneel the vehicle 10 at the wheel assembly 150. In embodiments, the hydraulic system 170 is controllable to change a wheel-travel value at which the wheel rate of the wheel assembly 150 increases (or decreases, depending on perspective, i.e., the hydraulic system 170 is controllable to change the knee point).

Reference is now made to FIGS. 36A, 36B, 36C, 36D and 37. The suspension system 100 of FIG. 36A comprises a telescopic damper 101, a rebound spring 105, and a force-transfer system 180 operative to apply a force to change one or more parameters of the suspension system 100. The one or more parameters include a length of the telescopic damper 101 in a first mode, and an engagement point of the rebound spring 105 in a second mode. Non-limiting examples of suspension systems 100 according to the disclosure of FIG. 36A include the suspension system 100 of FIGS. 11A, 11B, 12A, and 12B, the suspension systems 100 of FIGS. 13, 14, 15, 16, 17A, 17B, 17C, 19A, and 19B, the suspension systems 100 of FIGS. 20, 21, 22, 23, and 24, and the suspension systems 100 of FIGS. 25 and 26.

In some embodiments, as illustrated in the block diagram of FIG. 36B, the telescopic damper 100 includes the rebound spring 105. In some such embodiments, the force-transfer system 180 includes a mechanical actuator, e.g., an electrically powered mechanical actuator.

A non-limiting example of suspension systems 100 according to the disclosure of FIG. 36A is the suspension system 100 of FIGS. 11A, 11B, 12A, and 12B in which the rebound spring 105 is disposed within the telescopic damper 101, e.g., in the upper chamber 103 of damper body 110, i.e., surrounding the damper rod 115 above the piston valve 119. In some embodiments, the rebound spring 105 is arranged above the rebound stop 117, if present. The mechanical actuator can be powered by an electric motor 130, installed in the top mount 121 and thereby in communication with the damper rod 115. The actuator in the top mount 121 can include any type of actuator for applying a force to the damper rod 115 to produce vertical movement, such as a linear actuator or a lead screw. The electric motor 130 can be powered by any power source 18 located in the wheel assembly 150 or the vehicle platform 12/vehicle 10.

FIG. 11B illustrates operation of the suspension system 100 of FIG. 36B in the first mode in which the one or more parameters include a length of the telescopic damper 101. The mechanical actuator, powered by the electric motor 130, drives the damper rod 115 up into the damper body 110, as indicated by arrow 980. Driving the damper rod 115 shortens the overall length of the damper 101. In this mode, the rebound spring 105 is not necessarily engaged at any point. FIGS. 12A and 12B illustrate operation of the suspension system 100 in the second mode in which the one or more parameters comprise an engagement point of the rebound spring 105.

The damper 101 is shown schematically in FIG. 12A as being tuned to a design setting by setting the gap between the top of the rebound spring 105 and the rebound striker 112 to a predetermined gap-length 903. As indicated by arrow 981 in FIG. 12B, the force-transfer system 180 (the mechanical actuator in communication with the damper rod 115) is operative to raise the damper rod 115 so as to reduce the design gap-length 903 of FIG. 12A to a new design gap-length 904. This change means that the rebound spring 105 engages earlier in the rebound stroke of the damper 101.

Figures 36C, 36D, 37:
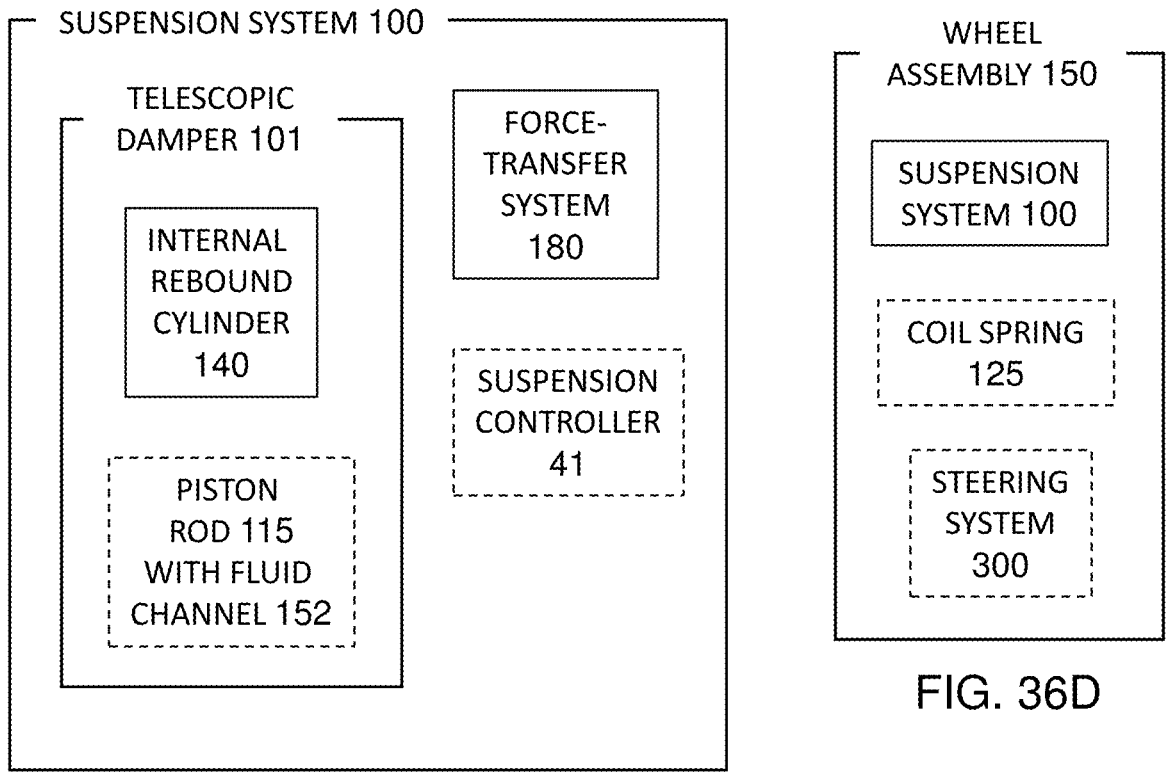

In some embodiments, as illustrated in the block diagram of FIG. 36C, the telescopic damper 100 includes an internal rebound cylinder 140 disposed within the telescopic damper 101 and arranged to encompass a rebound stop 117 or rebound piston 147 of the telescopic damper. (A rebound piston 147 is a rebound stop with additional features, such as a peripheral seals that serve to separate respective upper and lower chambers 143, 144 of the internal rebound cylinder 140.) In some such embodiments, the force-transfer system 180 includes a hydraulic system 170. In some embodiments, the internal rebound cylinder 140 comprises an active chamber, e.g., upper chamber 143, in fluid communication with the hydraulic system 170. As shown in FIG. 36C, the telescopic damper 101 can include a piston rod (damper rod) 115 comprising a lengthwise fluid channel 152 through which said fluid communication with the hydraulic system 170 is maintained. In some embodiments, the fluid channel 152 has an aperture 158 in fluid communication with the active chamber 143. In some embodiments, the hydraulic system 170 includes an external rebound cylinder 171 and a rebound-cylinder piston 173, and the rebound spring 105 is arranged within the hydraulic system 170 to be compressible by the rebound-cylinder 173 piston. In some embodiments, the hydraulic system 170 comprises a reservoir 174 in fluid communication with both the external rebound cylinder 171 and the active chamber, e.g., upper chamber 143, of the internal rebound cylinder 140. In some embodiments, a dead chamber, e.g., the lower chamber 144, of the internal rebound cylinder 140, has resilient biasing member such as, for example, a return spring 145, disposed therewithin.

A first non-limiting example of a suspension system 100 according to the disclosure of FIG. 36C is the suspension system 100 of FIG. 13, which includes an internal rebound cylinder 140. A second non-limiting example of suspension systems 100 according to the disclosure of FIG. 36C is the suspension system 100 of FIGS. 14, 15, 16, 17A, 17B. 17C, 19A, and 19B, which includes a rebound spring 105 in the internal rebound cylinder 140 and is effective to control the hydraulic system 170 to change a position of the internal rebound cylinder 140 relative to the rebound striker 112. A third non-limiting example of suspension systems 100 according to the disclosure of FIG. 36C is the suspension system 100 of FIGS. 20, 21, 22, 23, and 24 which includes a rebound spring 105 in the hydraulic system 170 and is effective to control the hydraulic system 170 to change a position of the internal rebound cylinder 140 relative to the rebound striker 112. A fourth non-limiting example of suspension systems 100 according to the disclosure of FIG. 36C is the suspension system 100 of FIGS. 25 and 26 comprising a yoked pair of telescopic dampers 101.

As shown in the block diagram of FIG. 36D, a wheel assembly 150 according to embodiments includes a suspension system 100 according to any one of FIGS. 36A, 36B and 36C. In some embodiments, the wheel assembly additionally includes a ride spring 125 surrounding at least a lengthwise portion of the telescopic damper 101. Referring again to FIG. 6, a vehicle 10 comprises a vehicle platform 12, which, according to embodiments, comprises multiple wheel assemblies 150 according to FIG. 36D. In some embodiments, the force-transfer system 180 is controllable to modify a wheel-travel value at which the wheel rate of the wheel assembly 150 changes in the second mode. In some embodiments, the respective force-transfer system 180 of each wheel assembly 150 of the plurality of wheel assemblies 150 of a vehicle platform 12 is individually controllable to change a respective wheel-travel value at which a wheel rate of the respective wheel assembly 150 changes in the second mode. In some embodiments, changing the length of the telescopic damper 101 in the first mode of the suspension system 100 is effective to kneel the vehicle 10 at the wheel assembly 150. In some embodiments, the ride spring 125 of FIG. 36D is characterized by a rest length and a fully-compressed length, and kneeling the vehicle 10 includes compressing the ride spring 125 to the fully-compressed length.

Referring now to FIG. 37, a method is disclosed for operating a vehicle 10, e.g., the vehicle 10 of FIG. 6, comprising a vehicle platform 12 that includes a plurality of wheel assemblies 150 according to FIG. 36D. In some embodiments, the method is carried out by a suspension controller 41 and/or by a wheel-assembly controller 50. As illustrated by the flow chart in FIG. 37, the method comprises the method steps S31 and S32:

Step S31: kneeling the vehicle 10 at a respective wheel assembly 150 by applying a force to shorten the telescopic damper 101.

Step S32: modifying a wheel-travel value at which the wheel rate of a respective wheel assembly 150 changes, by controlling application of the force to change one or more parameters of the suspension system 100.

Step S31 of the method is carried out at a first time, and Step S32 is carried out at a second time, i.e., a different time that Step S31, which can be later or earlier.

Each of the two steps relates to a different mode of the suspension system 100 or of the vehicle 10, and they cannot be carried out simultaneously.

Reference is now made to FIGS. 38 and 39. According to embodiments, a wheel assembly 150, e.g., for a vehicle such as vehicle 10 of FIG. 6, includes a suspension system 100. In some embodiments, the wheel assembly 150 includes a wheel assembly controller 50. In some designs, a wheel-assembly controller 50 performs some or all of the functions of a dedicated suspension controller 41 which may or may not be present (as a component of the suspension system 100) as well. In some designs, some of the control functionality with respect to the suspension system 100 can be shared and/or duplicated for redundancy purposes, with a dedicated suspension controller 41. In some embodiments, the wheel assembly 150 additionally includes a hydraulic system 170.

The suspension system 100 of FIG. 38 includes a telescopic damper 101 configured to mediate between an unsprung portion and a sprung portion of the wheel assembly, comprising a rebound striker 112 and a piston rod assembly 215 that includes a piston rod (damper rod) 115 and rebound stop 117, e.g., rebound piston 147. An internal rebound cylinder 140 is disposed within the telescopic damper, and the rebound piston 147 defines respective upper and lower chambers 143, 144, at least one of which is an active chamber. The internal rebound cylinder 140 is arranged in fluid communication with the hydraulic system 170, which is controllable to regulate a pressure in the active chamber, e.g., upper chamber 143, so as to change a position of the internal rebound cylinder 140 relative to the rebound striker 112. According to embodiments, the hydraulic system 170 is controllable to regulate a pressure in the active chamber 143 so as to change a position of the internal rebound cylinder 140 relative to the rebound striker 112 and, in a first operating mode, to regulate a wheel rate of the wheel assembly 150.

The suspension system 100 of FIG. 38 is effective in a first mode of vehicle operation to kneel the vehicle 10 at the wheel assembly 150 and in a second mode of vehicle operation to regulate a wheel rate of the wheel assembly 150.

In some embodiments, the hydraulic system 170 includes an external rebound cylinder 171, a rebound-cylinder piston 173, and a rebound spring 105 arranged within the hydraulic system 170 to be compressible by the rebound-cylinder piston 173. The rebound spring 105 is compressible by the rebound-cylinder piston 173 to change a wheel rate of the wheel assembly 150 in the second mode of vehicle operation. In some embodiments, the hydraulic system 170 is controllable, e.g., by suspension controller 41 and/or wheel-assembly controller 50, to change a wheel-travel value at which the wheel rate of the wheel assembly 150 decreases in the second mode of vehicle operation.

A non-limiting example of a suspension system 100 according to the disclosure of FIG. 38 is the suspension system 100 of FIGS. 20, 21, 22, and 24, which includes a rebound spring 105 in the hydraulic system 170 and is effective to control the hydraulic system 170 to change a position of the internal rebound cylinder 140 relative to the rebound striker 112 and kneel the vehicle 10 at the wheel assembly 150. In embodiments, the hydraulic system 170 is controllable to change a wheel-travel value at which the wheel rate of the wheel assembly 150 increases (or decreases, depending on perspective, i.e., the hydraulic system 170 is controllable to change the knee point).

In some embodiments, the suspension system 100 of FIG. 38 is effective, in a stationary kneeling mode, to kneel the vehicle 10 at the wheel assembly 150, as illustrated in FIG. 23. The kneeling includes controlling the hydraulic system 170 to regulate a hydraulic pressure in the active chamber 143 of the internal rebound cylinder 140 to shorten the length of the telescopic damper 101.

The suspension system 100 of FIG. 38, and by extension, of FIGS. 20-24, has the capability to control the position of maximum rebound wheel travel by modifying a rebound limit of the telescopic damper, to regulate a maximum steering angle of the steering system, and thereby control maximum steer angles. For selected slow speed maneuvering events, greater steering angles can be allowed during a limited vertical suspension travel range. Maximum steering angles (and therefore minimum turning circles) are often constrained by package (and working angles of joints) limitations that are encountered at maximum bump and rebound wheel travels, and specifically, the tire clearance to suspension strut can be the constraint that determines the maximum steering angle. By preventing full rebound travel in this mode, (e.g., by 15 mm), more clearance between the wheel and strut is available for the option of additional steering rack travel, which in this example achieves an extra 1 degree of road wheel steer angle. This results in the theoretical curb-to curb-turning circle diameter being reduced by 300 mm Referring again to FIG. 6, a vehicle 10 comprises a vehicle platform 12, which, according to embodiments, comprises multiple wheel assemblies 150 according to FIG. 38. In some embodiments, the force-transfer system 180 comprises a hydraulic system 170 and is controllable to modify a wheel-travel value at which the wheel rate of the wheel assembly 150 changes in the second mode. In some embodiments, the respective hydraulic system 170 of each wheel assembly 150 of the plurality of wheel assemblies 150 of a vehicle platform 12 is individually controllable to change a respective wheel-travel value at which a wheel rate of the respective wheel assembly 150 changes in the second mode. In some embodiments, changing the length of the telescopic damper 101 in the first mode of the suspension system 100 is effective to kneel the vehicle 10 at the wheel assembly 150. In some embodiments, the ride spring 125 of FIG. 38 is characterized by a rest length and a compressed length, and kneeling the vehicle 10 includes compressing the ride spring 125 to the compressed length.

Referring now to FIG. 39, a method is disclosed for operating a vehicle 10, e.g., the vehicle 10 of FIG. 6, comprising a vehicle platform 12 that includes a plurality of wheel assemblies 150 according to FIG. 38. In some embodiments, the method is carried out by a suspension controller 41 and/or by a wheel-assembly controller 50. As illustrated by the flow chart in FIG. 37, the method comprises the method steps S41 and S42:

Step S41: kneeling the vehicle 10 at a respective wheel assembly 150 by increasing a hydraulic pressure in the active chamber 143 of an internal rebound cylinder 140 to apply a force that shortens the telescopic damper 101.

Step S42: modifying a a wheel-travel value at which the wheel rate of a respective wheel assembly 150 changes, by controlling a hydraulic system 170 to regulate hydraulic pressure in the active chamber 143 of an internal rebound cylinder 140.

Step S41 of the method is carried out at a first time, and Step S42 is carried out at a second time, i.e., a different time that Step S41, which can be later or earlier. Each of the two steps relates to a different mode of the suspension system 100 or of the vehicle 10, and they cannot be carried out simultaneously.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise.

The invention claimed is:

1. A kneeling system for a wheel assembly of a vehicle, the kneeling system comprising:
   a. a telescopic damper configured to mediate between an unsprung portion and a sprung portion of the wheel assembly, the telescopic damper comprising a rebound striker and a piston rod assembly including a rebound stop; and
   b. an internal rebound cylinder disposed within the telescopic damper, the rebound striker being external to the internal rebound cylinder, the internal rebound cylinder encompassing the rebound stop, an active chamber of the internal rebound cylinder being arranged in fluid communication with a hydraulic system controllable to regulate a pressure in the active chamber so as to change a position of the internal rebound cylinder relative to the rebound striker and kneel the vehicle,
   wherein when the hydraulic system is not energized, the kneeling system is effective to operate at a design ride height so as to allow vehicle travel without kneeling.

2. The kneeling system of claim 1, additionally comprising a ride spring characterized by a rest length and a fully-compressed length, wherein kneeling the vehicle includes compressing the ride spring to the fully-compressed length.

3. The kneeling system of claim 1, wherein the active chamber of the internal rebound cylinder is in fluid communication with the hydraulic system through a fluid channel disposed in the piston rod of the telescopic damper.

4. The kneeling system of claim 1, wherein the internal rebound cylinder includes a dead chamber having a resilient biasing member disposed therewithin.

5. A vehicle platform comprising a plurality of wheel assemblies, each wheel assembly comprising the kneeling system of claim 1 and an electronics array for controlling the operation of the hydraulic system, wherein the respective hydraulic system of each wheel assembly of the plurality of wheel assemblies is individually controllable to kneel the vehicle at the respective wheel assembly.

6. A suspension system for a wheel assembly of a vehicle, the suspension system comprising:
   a. a telescopic damper configured to mediate between an unsprung portion and a sprung portion of the wheel assembly, the telescopic damper comprising a rebound striker and a piston rod assembly including a rebound stop;
   b. an internal rebound cylinder disposed within the telescopic damper, the internal rebound cylinder encompassing the rebound stop, the rebound striker being external to the internal rebound cylinder; and
   c. a hydraulic system arranged in fluid communication with an active chamber of the internal rebound cylinder, the hydraulic system being controllable to regulate a pressure in the active chamber so as to change a position of the internal rebound cylinder relative to the rebound striker and kneel the vehicle at the wheel assembly.

7. The suspension system of claim 6, wherein the active chamber of the internal rebound cylinder is in fluid communication with the hydraulic system through a fluid channel disposed in the piston rod of the telescopic damper.

8. The suspension system of claim 6, wherein the kneeling of the vehicle at the wheel assembly includes controlling the hydraulic system to increase a hydraulic pressure in the active chamber of the internal rebound cylinder.

9. The suspension system of claim 6, wherein the internal rebound cylinder includes a dead chamber having a resilient biasing member disposed therewithin.

10. The suspension system of claim 6, additionally comprising a ride spring surrounding a portion of the telescopic damper and characterized by a rest length and a fully-compressed length, wherein kneeling the vehicle includes compressing the ride spring to the fully-compressed length.

11. A wheel assembly comprising: the suspension system of claim 6, and an electronics array for controlling the operation of the hydraulic system.

12. The wheel assembly of claim 11, wherein when the hydraulic system is not energized, the suspension system is effective to operate, at a design ride height, in a mode that does not include kneeling of the vehicle.

13. A vehicle platform comprising a plurality of wheel assemblies according to claim 11, wherein the respective hydraulic system of each wheel assembly of the plurality of wheel assemblies is individually controllable to kneel the vehicle at the respective wheel assembly.

14. The vehicle platform of claim 13, wherein the respective hydraulic systems of the plurality of wheel assemblies are jointly controllable, by the respective electronics arrays of the plurality of wheel assemblies being in communication with each other and/or with a controller of the vehicle platform, to kneel the vehicle at the plurality of wheel assemblies.

15. A method of operating a vehicle comprising the vehicle platform of claim 13, the method comprising, for each wheel assembly of the plurality of wheel assemblies: kneeling the vehicle at the respective wheel assembly by regulating a pressure in the active chamber so as to change a position of the internal rebound cylinder relative to the rebound striker and kneel the vehicle at the wheel assembly.

16. The method of claim 15, wherein changing the hydraulic pressure in the active chamber includes increasing the hydraulic pressure in the active chamber.

17. The suspension system of claim 6, wherein the telescopic damper is a first telescopic damper, the suspension system additionally comprising
   a second telescopic damper yoked to the first telescopic damper to form a yoked pair of telescopic dampers, the yoked pair being configured to mediate between the unsprung portion and the sprung portion of the wheel assembly, the second telescopic damper comprising: (i) a respective piston rod assembly including a respective rebound stop, and (ii) a respective internal rebound cylinder disposed within the second telescopic damper, the respective internal rebound cylinder encompassing the respective rebound stop,
   wherein the hydraulic system includes (i) external rebound cylinder and (ii) a rebound spring arranged within the hydraulic system to be compressible by pressure in the external rebound cylinder, the hydraulic system being arranged in parallel fluid communication with the active chamber of the respective internal rebound cylinder of the first telescopic damper and an active chamber of the respective internal rebound cylinder the second telescopic damper, and controllable to regulate a pressure in, the active chamber of each respective internal rebound cylinder, and
   wherein the kneeling of the vehicle at the wheel assembly is in a first mode of vehicle operation, and the suspension system is further effective, in a second mode of vehicle operation, to regulate a wheel rate of the wheel assembly.

18. The suspension system of claim 17, wherein the hydraulic system is controllable to change a wheel-travel value at which the wheel rate of the wheel assembly decreases in the second mode of vehicle operation.

19. A wheel assembly comprising the suspension system of claim 17 and a control system programmed to control the hydraulic system in both the first and second modes of vehicle operation.

20. The wheel assembly of claim 19, wherein all of the components of the suspension system are installed in the wheel assembly.

21. The suspension system of claim 6, wherein the telescopic damper is a first telescopic damper, the suspension system additionally comprising a second telescopic damper yoked to the first telescopic damper to form a yoked pair of telescopic dampers, the yoked pair being configured to mediate between the unsprung portion and the sprung portion of the wheel assembly, the second telescopic damper comprising: (i) a respective piston rod assembly including a respective rebound stop, and (ii) a respective internal rebound cylinder disposed within the second telescopic damper, the respective internal rebound cylinder encompassing the respective rebound stop.

22. The suspension system of claim 21, wherein the hydraulic system includes (i) an external rebound cylinder and (ii) a rebound spring arranged within the hydraulic system to be compressible by pressure in the external rebound cylinder, the hydraulic system being arranged in parallel fluid communication with the active chamber of the respective internal rebound cylinder of the first telescopic damper and an active chamber of the respective internal rebound cylinder of the second telescopic damper, and controllable to regulate a pressure in, the active chamber of each respective internal rebound cylinder.

* * * * *